(12) United States Patent
Ohori et al.

(10) Patent No.: US 12,299,532 B2
(45) Date of Patent: May 13, 2025

(54) CODE READER AND CODE READING METHOD

(71) Applicant: Keyence Corporation, Osaka (JP)

(72) Inventors: Hiroomi Ohori, Osaka (JP); Taichi Tajika, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/527,681

(22) Filed: Dec. 4, 2023

(65) Prior Publication Data

US 2024/0242047 A1    Jul. 18, 2024

(30) Foreign Application Priority Data

Jan. 13, 2023  (JP) ................... 2023-003906
Sep. 8, 2023   (JP) ................... 2023-146152

(51) Int. Cl.
*G06K 7/14*    (2006.01)
*G06K 7/10*    (2006.01)

(52) U.S. Cl.
CPC ....... *G06K 7/1486* (2013.01); *G06K 7/10732* (2013.01); *G06K 7/1473* (2013.01)

(58) Field of Classification Search
CPC . G06K 7/1486; G06K 7/10732; G06K 7/1473
USPC .................................................. 235/462.01
See application file for complete search history.

(56) References Cited

U.S. PATENT DOCUMENTS 6,783,068 B2 *   8/2004  Hecht ............... G06K 7/10801
                                                235/435
2003/0085284 A1 *  5/2003  Bremer ................... G06K 7/14
                                                235/462.32

OTHER PUBLICATIONS

U.S. Appl. No. 18/527,659, filed Dec. 4, 2023 (117 pages).

* cited by examiner

*Primary Examiner* — Michael G Lee
*Assistant Examiner* — David Tardif
(74) *Attorney, Agent, or Firm* — Kilyk & Bowersox, P.L.L.C.

(57) ABSTRACT

Evaluation of a code misassignment risk is enabled, and occurrence of misassignment of a code is prevented. A code reader includes: an imaging unit that includes a Scheimpflug optical system including a lens and an image sensor having a light receiving surface inclined with respect to an optical axis of the lens, the imaging unit generating and outputting a code image including the code; and a control unit that executes decoding processing on the code image. The control unit calculates an index for evaluating whether or not a code to which the decoding processing has been applied is a code that has been decoded in a depth-of-field region formed substantially perpendicular to a conveying surface of a conveyor by the Scheimpflug optical system based on a result of the decoding processing, and determines whether or not the code is assigned to a wrong workpiece based on the index.

15 Claims, 32 Drawing Sheets

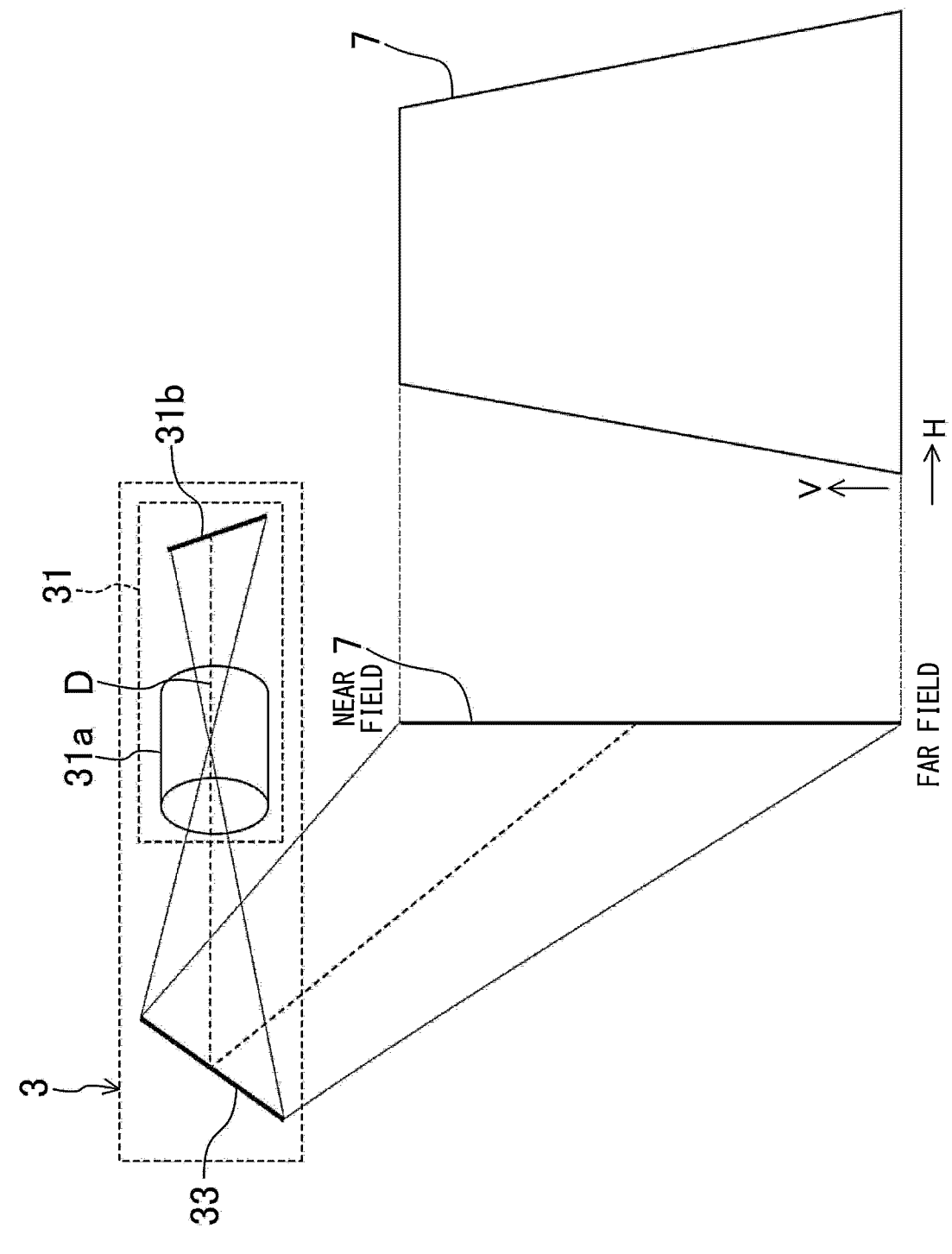

CODE READER AND CODE READING METHOD

CROSS-REFERENCE TO RELATED APPLICATIONS

The present application claims foreign priority based on Japanese Patent Application No. 2023-003906, filed Jan. 13, 2023, and No. 2023-146152, filed Sep. 8, 2023, the contents of which are incorporated herein by references.

BACKGROUND OF THE INVENTION

1. Field of the Invention

The disclosure relates to a code reader and a code reading method of reading a code attached to a workpiece.

2. Description of Related Art

For example, in distribution sites handling a large number of articles (hereinafter, referred to as workpieces), codes are attached to the workpieces, respectively, and codes of the workpieces in the middle of being conveyed by a conveyor are read by code readers, and the workpieces are sorted according to reading results.

In addition, for example, code readers are also used for the purpose of so-called traceability that enables a distribution route of an article to be tracked from a manufacturing stage to a consumption stage or a disposal stage in some cases, and the code readers are utilized in various fields.

In general, a code reader is configured to be capable of capturing an image of a code attached to a workpiece with an imaging unit, cutting and binarizing the code included in the obtained image by image processing, and reading information by decoding processing.

As this type of code reader, there is known a code reader including a so-called Scheimpflug optical system in which a light receiving surface of an imaging unit is inclined with respect to an optical axis of a lens such that a depth of field in a direction perpendicular to a conveyor surface becomes deeper (see, for example, U.S. Pat. No. 6,783,068).

In the code reader of U.S. Pat. No. 6,783,068, a workpiece height is measured using a dimension measuring sensor, and pixels corresponding to the measured workpiece height are read out, thereby speeding up reading processing.

By the way, there is a case where an interval between workpieces conveyed by a conveyor is narrow in the distribution sites, and it may be difficult to determine which of the workpieces aligned in a conveying direction a code read by the code reader should be assigned to. For example, if a code attached to the workpiece on the upstream side in the conveying direction is read but the code is assigned to the workpiece on the downstream side, the subsequent processing becomes wrong processing.

SUMMARY OF THE INVENTION

The disclosure has been made in view of such a point, and an object thereof is to enable evaluation of a code misassignment risk and prevent occurrence of code misassignment.

In order to achieve the above object, according to one embodiment of the disclosure, a code reader that reads a code attached to a workpiece moving on a conveyor can be assumed. The code reader includes: an illumination unit that irradiates the workpiece with illumination light; an imaging unit that includes a Scheimpflug optical system including a lens collecting reflected light from the code attached to the workpiece and an image sensor having a light receiving surface inclined with respect to an optical axis of the lens, the imaging unit generating and outputting a code image including the code based on an amount of received light received by the light receiving surface; and a control unit that executes decoding processing on the code image. When the code reader is installed above the conveyor, the Scheimpflug optical system can form a depth-of-field region along a direction substantially perpendicular to the conveyor, and the control unit can calculate an index for evaluating whether or not a code to which the decoding processing has been applied is a code that has been decoded in the depth-of-field region, and determine whether or not the code is assigned to a wrong workpiece based on the calculated index.

According to this configuration, when the depth-of-field region is set along a plane perpendicular to a conveying surface of the conveyor in the Scheimpflug optical system, a depth of field in a conveying direction of the conveyor can be made shallow. Therefore, it is possible to calculate the index (jamming risk level) for evaluating whether or not the code has been decoded in the depth-of-field region of the Scheimpflug optical system, and to determine whether or not the decoded code is assigned to the wrong workpiece based on the calculated index.

The imaging unit captures images of a plurality of the workpieces moving adjacent to each other on the conveyor to generate the code image in which a plurality of the codes including the codes respectively attached to the plurality of workpieces appear, and the control unit specifies a target workpiece located in the depth-of-field region at a point in time when the code image is captured, calculates the index based on information obtained from the code image, and determines that assignment of a code, evaluated to have a relatively high possibility of having been decoded in the depth-of-field region, to the target workpiece is accurate based on the index. Therefore, even in a case where the plurality of workpieces is included in a visual field of the imaging unit and an interval between the workpieces is narrow, it is possible to improve the accuracy of a process of associating the codes and the workpieces, respectively.

The code reader can also output an error signal when the control unit determines that the code is assigned to the wrong workpiece, and thus, a user can be notified of occurrence of misassignment of the code.

The imaging unit may include an aperture adjustment mechanism, and may be configured to be capable of changing the depth of field region formed by the Scheimpflug optical system by adjusting the amount of aperture using the aperture adjustment mechanism. In this case, the control unit can calculate the index based on the depth-of-field region according to the amount of aperture.

According to one embodiment of the disclosure, a code reading method of reading a code attached to a workpiece moving on a conveyor can be assumed. The code reading method includes: an illumination step of irradiating a workpiece with illumination light; an imaging step of capturing an image of the workpiece by an imaging unit, which includes a Scheimpflug optical system including a lens collecting reflected light from the code attached to the workpiece and an image sensor having a light receiving surface inclined with respect to an optical axis of the lens, and generating and outputting a code image including the code based on an amount of received light received by the light receiving surface; a decoding step of performing decoding processing on the code image; a calculation step of calculating, based on a result of the decoding processing, an index for evaluating whether or not a code to which the decoding processing has been applied is a code that has been decoded in a depth-of-field region formed substantially perpendicular to a conveying surface of the conveyor by the Scheimpflug optical system; and a determination step of determining whether or not the code is assigned to a wrong workpiece based on the index calculated in the calculation step.

As described above, it is possible to determine whether or not the decoded code is assigned to the wrong workpiece by calculating the index for evaluating whether or not the code has been decoded in the depth of field region, formed substantially perpendicular to the conveying surface of the conveyor, which can prevent occurrence of misassignment of the code.

BRIEF DESCRIPTION OF THE DRAWINGS

FIG. 4 is a schematic view illustrating a relationship among a Scheimpflug optical system, a plane mirror, and a focal plane;

DETAILED DESCRIPTION OF PREFERRED EMBODIMENTS

Hereinafter, embodiments of the invention will be described in detail with reference to the drawings. Note that the following preferred embodiments are described merely as examples in essence, and there is no intention to limit the invention, its application, or its use.

Figure 1:
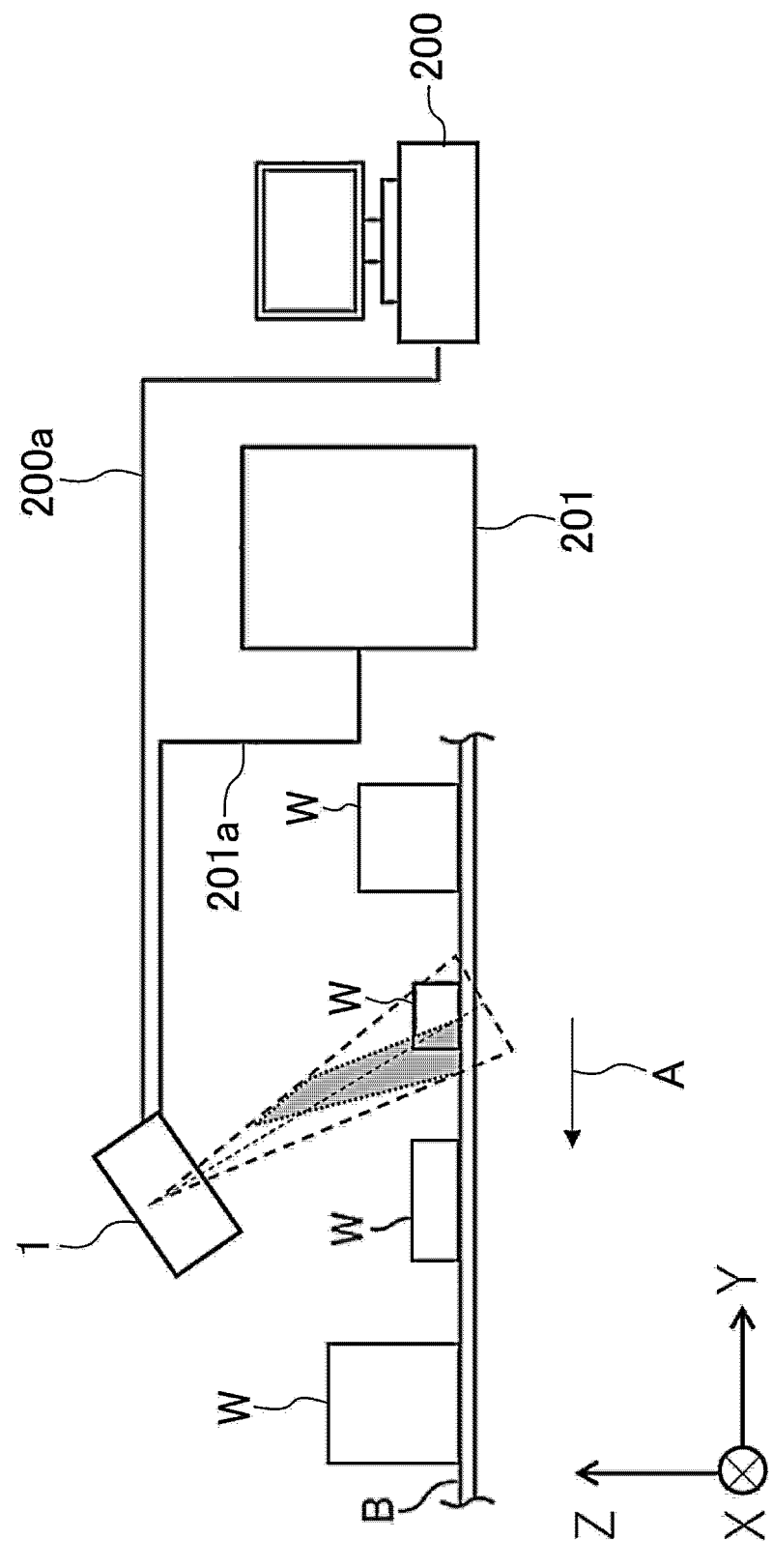
FIG. 1 is a view for describing the operation time of a code reader according to an embodiment of the invention.

FIG. 1 is a view schematically illustrating the operation time of a code reader 1 according to an embodiment of the invention. In this example, a plurality of workpieces W are conveyed in a direction of arrow A in FIG. 1 in the state of being placed on an upper surface of a conveyor B for conveyance (hereinafter, referred to as a conveyor), the code reader 1 according to the embodiment is installed at a place separated upward from the workpieces W. The conveyor B is configured using, for example, a belt conveyor or the like, and is capable of sequentially conveying a large number of workpieces W. A width direction of the conveyor B is along an X direction, and a conveying direction of the conveyor B is along a Y direction. Note that the code reader 1 may be installed at a place separated sideways from the workpieces W as will be described later.

The code reader 1 is configured to be capable of capturing an image of a code attached to the workpiece W moving on the conveyor B to generate a code image and decoding the code included in the code image to read information. In the example illustrated in FIG. 1, the code reader 1 is a stationary type. In the operation time of the stationary code reader 1, the code reader 1 is used in the state of being fixed to a bracket or the like (not illustrated) so as not to move. Note that the stationary code reader 1 may be used in the state of being held by a robot (not illustrated). In addition, the code of the workpiece W in a stationary state may be read by the code reader 1. The operation time of the stationary code reader 1 is the time during which an operation of sequentially reading codes of the workpieces W conveyed by the conveyor B is performed.

Figure 2:
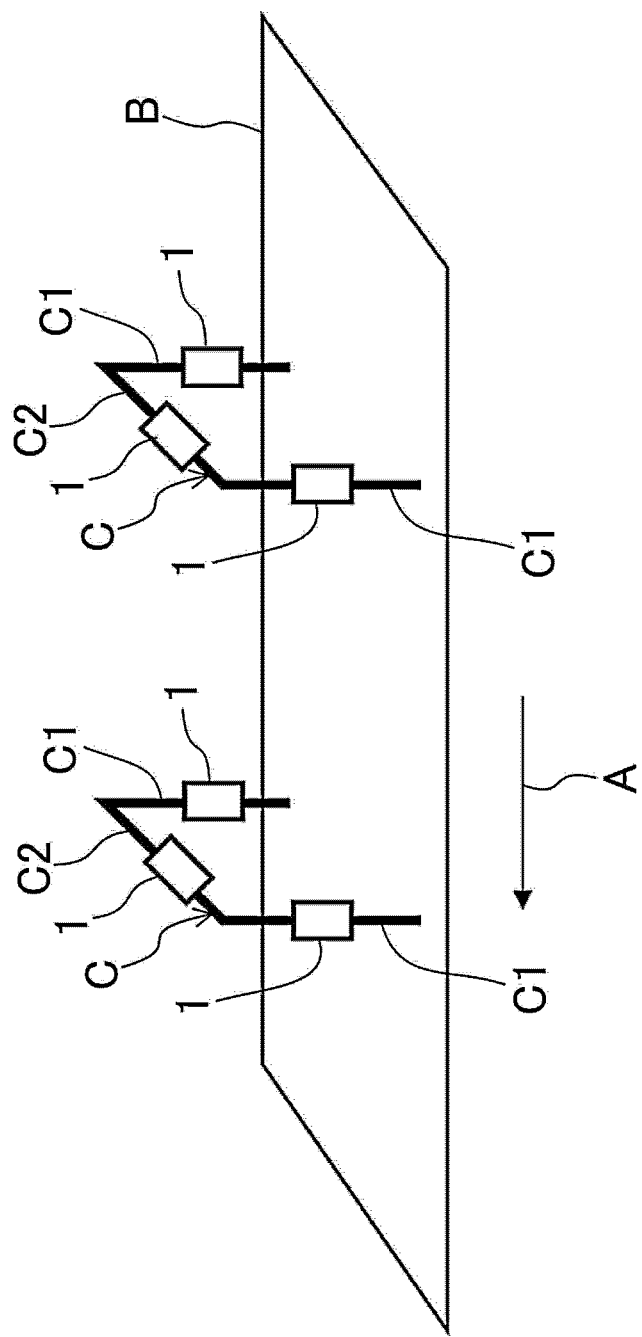
FIG. 2 is a view illustrating an example in the operation time of the code reader.

An example illustrated in FIG. 2 is an example in which a plurality of the code readers 1 are used on the single conveyor B. In this example, a support member C is installed in a part through which the workpiece W conveyed by the conveyor B passes. The support member C includes a pair of side members C1 extending in an up-down direction on the side of the workpiece W conveyed by the conveyor B, and an upper member C2 extending so as to connect upper parts of the side members C1. The code reader 1 is attached to each of the side members C1 so as to face a side surface of the workpiece W conveyed by the conveyor B, and the code reader 1 is attached to the upper member C2 so as to face an upper surface of the workpiece W conveyed by the conveyor B. A plurality of the support members C may be provided at intervals in the conveying direction of the conveyor B, or only one support member C may be provided. The code reader 1 may be attached only to the upper member C2 or may be attached only to the side member C1.

In addition, the codes are attached to outer surfaces of the workpieces W, respectively. The codes include both a barcode and a two-dimensional code. Examples of the two-dimensional code include a QR code (registered trademark), a micro QR code, a data matrix (data code), a Veri code, an Aztec code, PDF 417, a Maxi code, and the like. The two-dimensional code has a stack type and a matrix type, and the invention can be applied to any two-dimensional code. The code may be attached by printing or engraving directly on the workpiece W, may be attached by being printed on a label and then pasted to the workpiece W, and any mechanism or method may be used.

Although the code reader 1 is connected to a computer 200 and a programmable logic control unit (PLC) 201 in a wired manner by signal lines 200a and 201a, respectively, as illustrated in FIG. 1, the code reader 1 may be wirelessly connected with the computer 200 and the PLC 201 by providing built-in wireless communication modules in the code reader 1, the computer 200, and the PLC 201 without being limited thereto. The PLC 201 is a control device configured for sequence control of the conveyor B and the code reader 1, and can use a general-purpose PLC. The computer 200 can use a general-purpose or dedicated electronic calculator, portable terminal, or the like.

In addition, the code reader 1 receives a reading start trigger signal that defines a code reading start timing from the PLC 201 via the signal line 201a during its operation time. Then, the code reader 1 performs imaging and decoding of the code based on the reading start trigger signal. Thereafter, a result of the decoding is transmitted to the PLC 201 via the signal line 201a. In this manner, in the operation time of the code reader 1, the input of the reading start trigger signal and the output of the decoding result are repeatedly performed via the signal line 201a between the code reader 1 and an external control device such as the PLC 201. Note that the input of the reading start trigger signal and the output of the decoding result may be performed via the signal line 201a between the code reader 1 and the PLC 201 as described above, or may be performed via another signal line (not illustrated). For example, a sensor configured to detect arrival of the workpiece W and the code reader 1 are directly connected to each other to input the reading start trigger signal from the sensor to the code reader 1.

Figure 3:
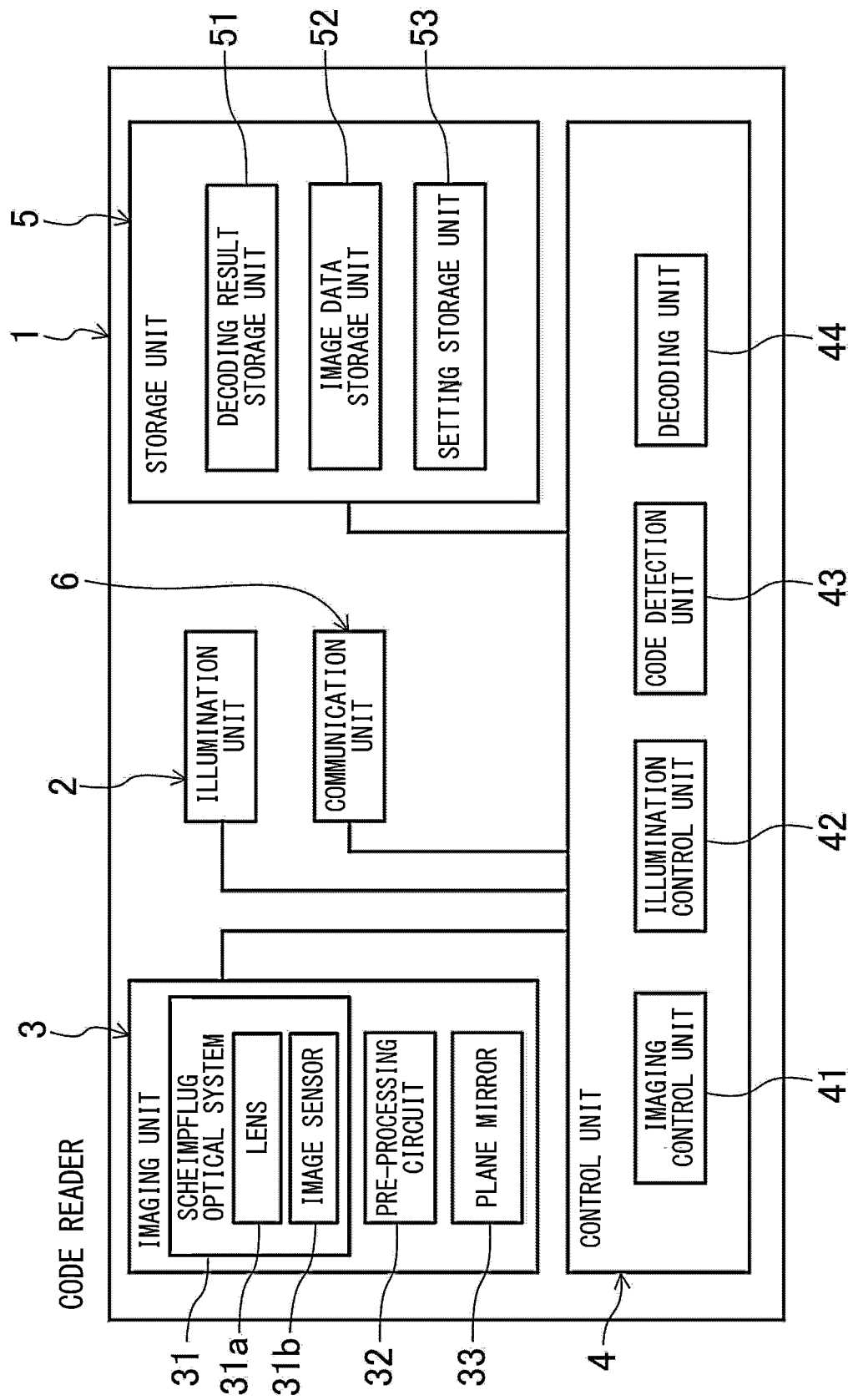
FIG. 3 is a block diagram of the code reader.

FIG. 3 is a block diagram of the code reader 1. The code reader 1 includes an illumination unit 2, an imaging unit 3, a control unit 4, a storage unit 5, and a communication unit 6. The control unit 4 includes an imaging control unit 41 that controls the imaging unit 3, an illumination control unit 42 that controls the illumination unit 2, a code detection unit 43, and a decoding unit 44. In addition, the storage unit 5 can be configured using a readable/writable storage device such as a solid state drive (SSD). The storage unit 5 can store, for example, various programs, decoding results, image data, setting information, and the like, and includes a decoding result storage unit 51, an image data storage unit 52, and a setting storage unit 53. Although not illustrated, the decoding result storage unit 51, the image data storage unit 52, and the setting storage unit 53 may be stored in separate storage devices.

The communication unit 6 is a part that executes communication with the computer 200 and the PLC 201. The setting information by the computer 200 is received by the control unit 4 via the communication unit 6. In addition, the control unit 4 receives the reading start trigger signal from the PLC 201 via the communication unit 6. The decoding result obtained by the code reader 1 is transmitted to the computer 200 or the PLC 201 via the communication unit 6.

The illumination unit 2 is a part that irradiates the workpiece W with illumination light, and includes a light emitter including, for example, a light emission diode (LED) or the like. The illumination unit 2 and the imaging unit 3 may be integrated, or the illumination unit 2 and the imaging unit 3 may be separated. The illumination unit 2 is controlled by the illumination control unit 42 to be switched on and off, change brightness at the time of being turned on, and the like. When the reading start trigger signal is input from the PLC 201, the illumination control unit 42 turns on the illumination unit 2 for a predetermined time and turns off the illumination unit 2 after a predetermined time has elapsed.

The imaging unit 3 is a part that captures an image of the workpiece W to generate a code image including a code and outputs the code image to the control unit 4. The imaging unit 3 includes a Scheimpflug optical system 31, a pre-processing circuit 32, and a plane mirror 33. As also illustrated in FIG. 4, the Scheimpflug optical system 31 includes a lens 31a and an image sensor 31b having a light receiving surface inclined with respect to an optical axis D of the lens 31a. The lens 31a is an image forming lens that collects reflected light from the code attached to the workpiece W, and incident light is emitted toward the light receiving surface of the image sensor 31b and forms an image on the light receiving surface.

Figure 5A:
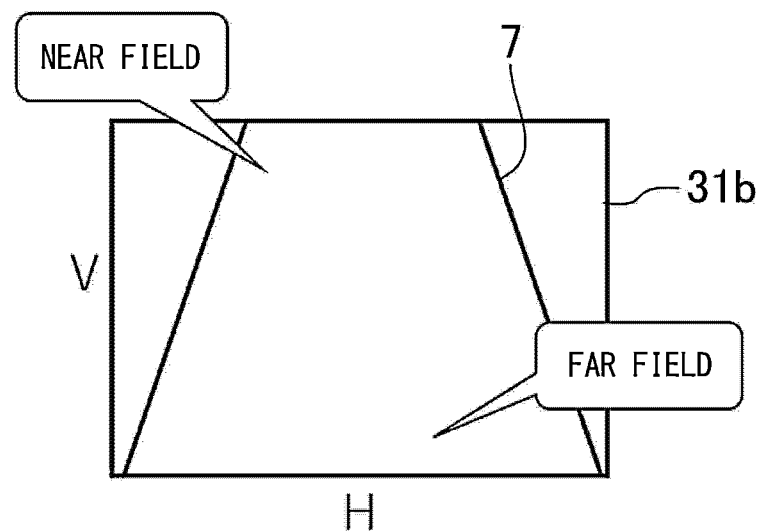
FIG. 5A is a view illustrating a shape of the focal plane formed on a light receiving surface.
Figure 5B:
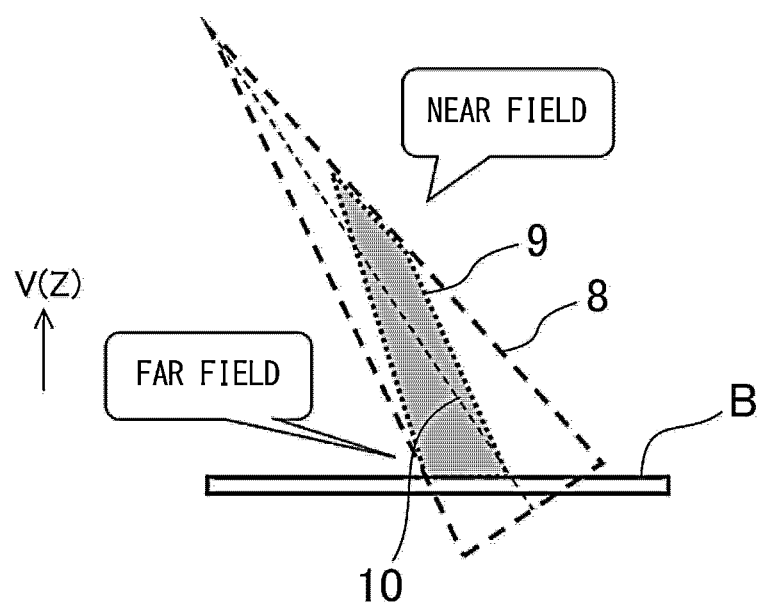
FIG. 5B is a view illustrating a visual field range and a region in focus viewed from a side.

The plane mirror 33 is a member for directing the light incident on the imaging unit 3 toward the lens 31a. That is, since the Scheimpflug optical system 31 is provided in this example, a focal plane 7 is formed to extend in a V direction of the image sensor 31b. The V direction corresponds to a Z direction (a height direction) in FIG. 1. FIG. 5A illustrates a shape of the focal plane 7 formed on the light receiving surface of the image sensor 31b, in which a far field and a near field coincide with fa far field and a near field in FIG. 4. As illustrated in FIG. 5A, a width (in an H direction) of the focal plane 7 is narrower in the near field than in the far field. FIG. 5B is viewed from a direction corresponding to FIG. 1, in which a far field and a near field coincide with a far field and a near field in FIG. 5A. In FIG. 5B, a visual field range of the image sensor 31b is indicated by reference sign 8, and a region in focus is indicated by reference sign 9. In addition, an optical axis extending at the center of the visual field range 8 is indicated by reference sign 10. In this manner, the Scheimpflug optical system 31 has an inclination of the focal plane 7 in the V direction of the image sensor 31b. Therefore, as illustrated in FIG. 1, when the code reader 1 is installed above the conveyor B, it is possible to form a depth of field along a direction (the Z direction) substantially perpendicular to the conveyor B.

Figure 6A:
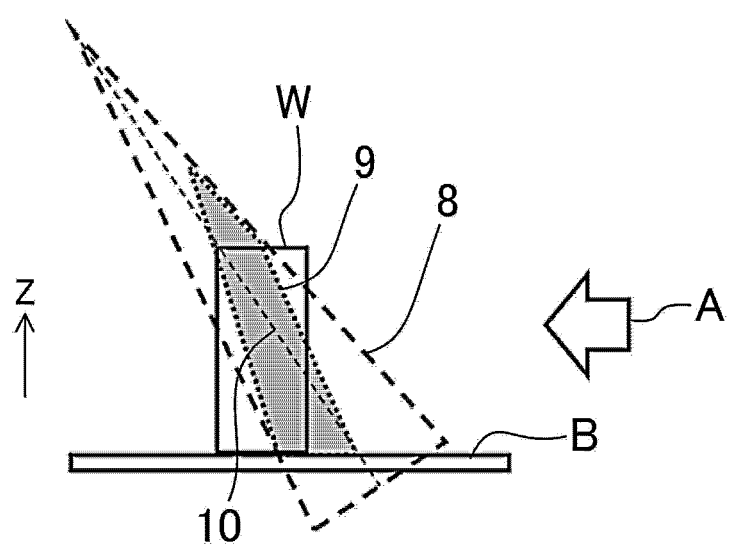
FIG. 6A is a view for describing a case where a workpiece having a high height enters the visual field range.
Figure 6B:
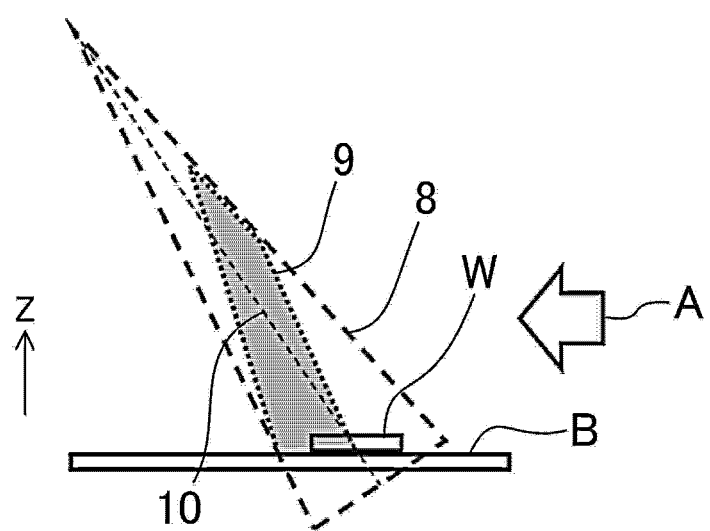
FIG. 6B is a view for describing a case where a workpiece having a low height enters the visual field range.

For example, in a case where the code reader 1 is used in a distribution site, the code reader 1 reads the code of the workpiece W in the middle of being conveyed by the conveyor B, and sorts the workpiece W according to a reading result. There are various sizes and shapes of the workpieces W handled in such a site, and the workpiece W having a high height and the workpiece W having a low height are sometime present together. FIG. 6A illustrates a case where the workpiece W having a high height enters the visual field range 8 when the code reader 1 is installed above the conveyor B. On the other hand, FIG. 6B illustrates a case where the workpiece W having a low height enters the visual field range 8 when the code reader 1 is installed above the conveyor B. Assuming that codes are attached to upper surfaces of the workpieces W, it is necessary to set an in-focus position upward in the case illustrated in FIG. 6A as compared with the case illustrated in FIG. 6B, and it is necessary to set an in-focus position downward in the case illustrated in FIG. 6B as compared with the case illustrated in FIG. 6A.

In the present embodiment, the depth of field along the direction substantially perpendicular to the conveyor B can be formed since the Scheimpflug optical system 31 is provided, and thus, it is possible to generate a code image focused on the code on the upper surface of the workpiece W in both the case illustrated in FIG. 6A and the case illustrated in FIG. 6B.

Figure 7A:
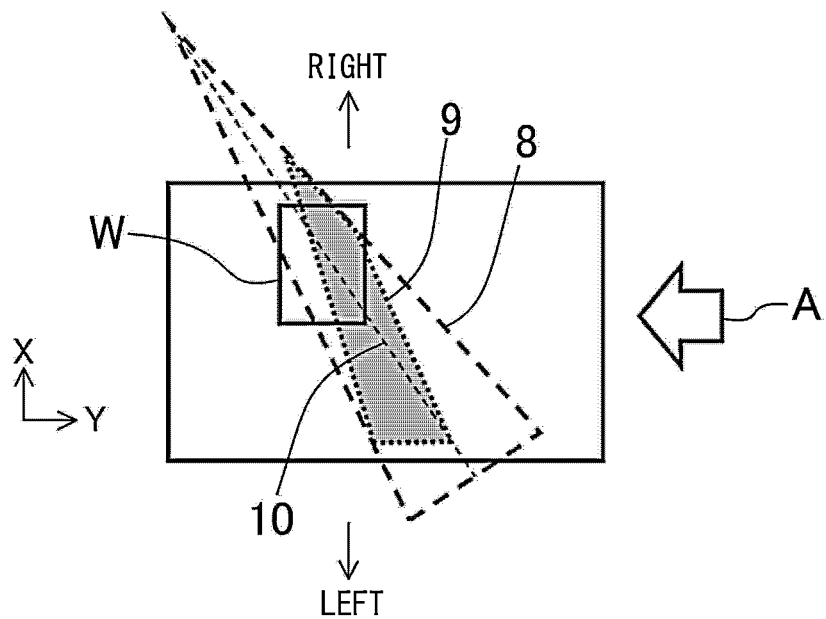
FIG. 7A is a view for describing a case where a workpiece is conveyed in the state of being off-center to the right.
Figure 7B:
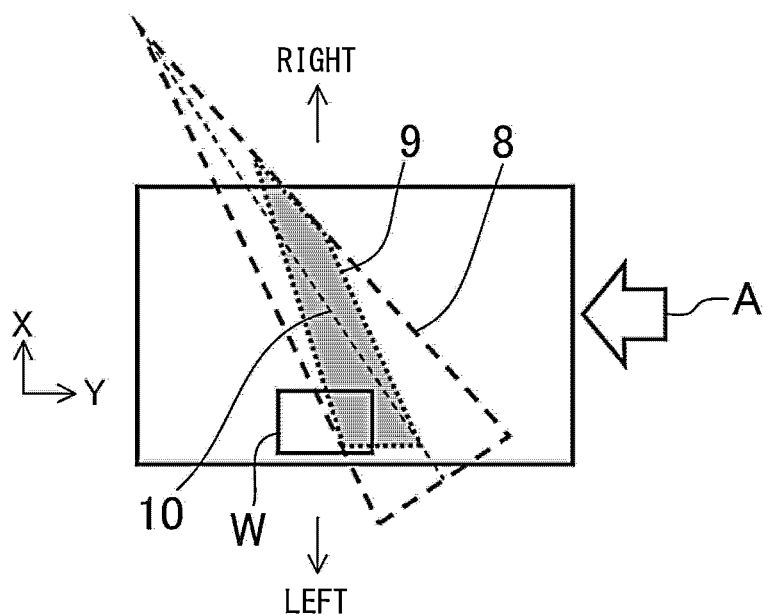
FIG. 7B is a view for describing a case where a workpiece is conveyed in the state of being off-center to the left.

In addition, in the distribution site, the workpiece W is conveyed in the state of being off-center to the right in some cases or conveyed in the state of being off-center to the left in other cases when viewed from upstream to downstream in the conveying direction of the conveyor B. In FIG. 7A, the workpiece W with a code attached to a right side surface is conveyed in the state of being off-center to the right on the conveyor B. On the other hand, FIG. 7B assumes a case where the workpiece W with the code attached to the right side surface is conveyed in the state of being off-center to the left on the conveyor B. It is necessary to set an in-focus position rightward in the case illustrated in FIG. 7A as compared with the case illustrated in FIG. 7B, and it is necessary to set an in-focus position leftward in the case illustrated in FIG. 7B as compared with the case illustrated in FIG. 7A. In this case, the code reader 1 is attached to the side member C1 on the right illustrated in FIG. 2, and the code reader 1 is installed on the right of the workpiece W conveyed by the conveyor B. The code reader 1 includes the Scheimpflug optical system 31, and thus, can form the depth of field along the width direction of the conveyor B when being installed on the right side of the workpiece W conveyed by the conveyor B. Therefore, a code image focused on the code on the right side surface of the workpiece W can be generated in both the case illustrated in FIG. 7A and the case illustrated in FIG. 7B. Note that, in a case where a code is attached to a left side surface of the workpiece W, it is sufficient for the code reader 1 to be operated in the state of being attached to the side member C1 on the left illustrated in FIG. 2.

The image sensor 31b illustrated in FIG. 3 includes a light receiving element such as a charge-coupled device (CCD) or a complementary metal oxide semiconductor (CMOS) that converts an image of a code obtained through the lens 31a into an electrical signal. A code image including the code is generated based on the amount of light received by the light receiving surface of the image sensor 31b. The code image generated by the image sensor 31b is input to the pre-processing circuit 32. The pre-processing circuit 32 may be provided as necessary, and is not essential.

The pre-processing circuit 32 is configured using, for example, an integrated circuit such as a field programmable gate array (FPGA), and is a part that executes various types of pre-processing on the code image output from the image sensor 31b. The pre-processing includes, for example, various types of filter processing. The imaging unit 3 outputs the code image pre-processed by the pre-processing circuit 32 to the control unit 4. The pre-processing by the pre-processing circuit 32 may be executed as necessary, and the code image not subjected to the pre-processing may be output to the control unit 4. The code image that has been output to the control unit 4 is stored in the image data storage unit 52 included in the storage unit 5.

The imaging unit 3 is controlled by the imaging control unit 41. When the reading start trigger signal is input from the PLC 201, the imaging control unit 41 performs exposure for a preset exposure time to generate a code image. The imaging control unit 41 controls the imaging unit 3 to execute a process of applying a preset gain to the code image generated by the image sensor 31b and amplifying brightness of the code image by digital image processing.

(Details of Control Unit 4)

The control unit 4 includes a microcomputer including a central processing unit, a ROM, a RAM, and the like. The imaging control unit 41, the illumination control unit 42, the code detection unit 43, and the decoding unit 44 are configured by hardware included in the control unit 4, software executed by the control unit 4, and the like.

The code detection unit 43 of the control unit 4 is a part that specifies a code region based on a code image output from the imaging unit 3 and detects a code from the specified code region. The decoding unit 44 of the control unit 4 is a part that decodes the code detected by the code detection unit 43, and specifically, decodes data binarized into black and white since the code is represented by the data binarized into black and white. For the decoding, a table indicating a contrast relationship of encoded data can be used. Further, the decoding unit 44 checks whether or not a decoding result is correct according to a predetermined check scheme. When an error is found in data, correct data is calculated using an error correction function. The error correction function varies depending on code types. Hereinafter, details of the code detection unit 43 and the decoding unit 44 will be specifically described.

(Overall Flowchart)

Figure 8:
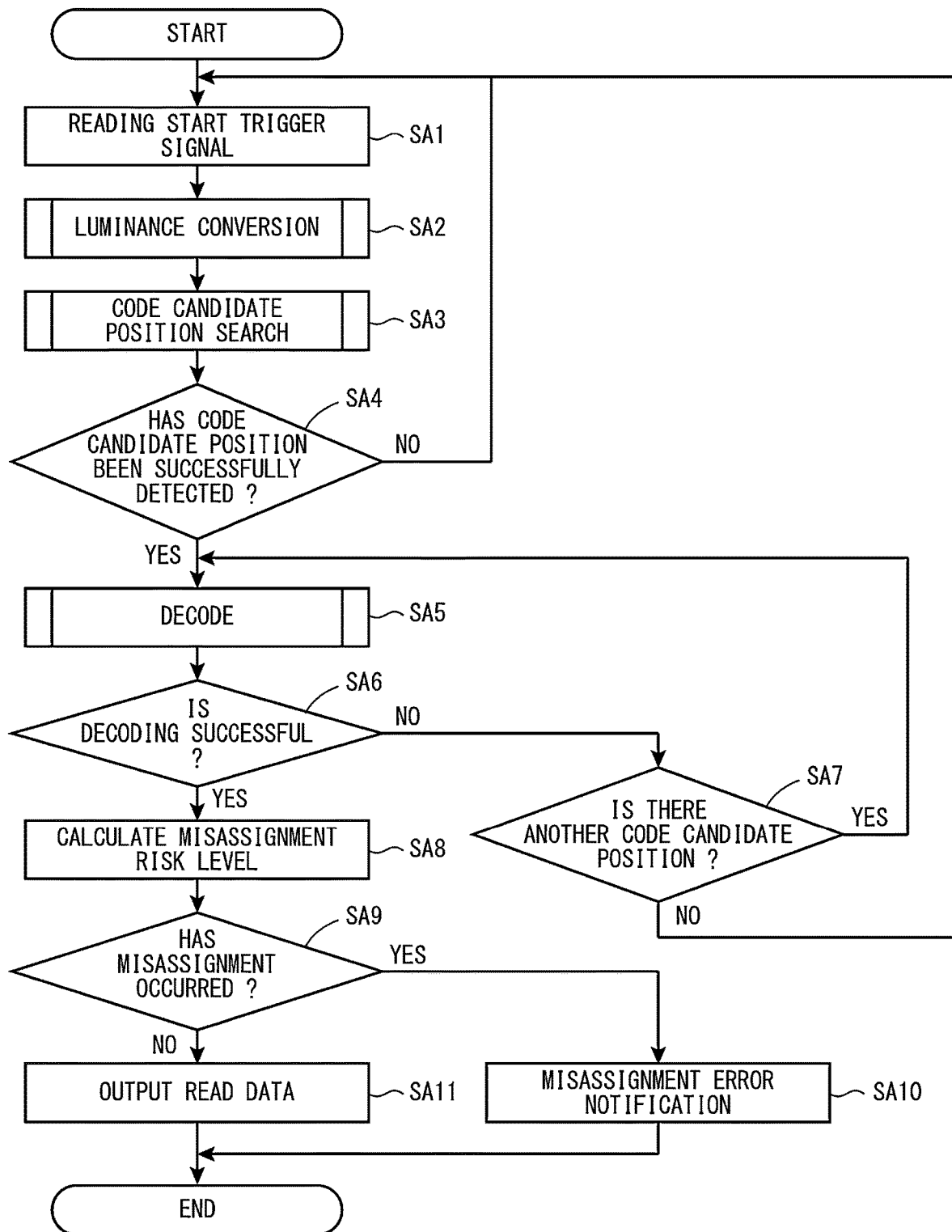
FIG. 8 is an overall flowchart.

FIG. 8 is an overall flowchart illustrating an example of a series of processing from imaging to output of a reading result. This flowchart starts at a point in time when the operation of the code reader 1 is started. In Step SA1 after the start, a reading start trigger signal is input from the PLC 201 to the code reader 1. When the reading start trigger signal is input, the illumination control unit 42 turns on the illumination unit 2, and the imaging control unit 41 causes the imaging unit 3 to perform imaging to generate a code image. Step SA1 is an illumination step of irradiating the workpiece W with illumination light.

In Step SA2, luminance conversion processing is executed. That is, since the Scheimpflug optical system 31 is provided in this example, focusing is performed from the near field to the far field as described with reference to FIGS. 6A and 6B, the near field is in focus in an upper portion of the image sensor 31b illustrated in FIG. 5A, and the far field is in focus in a lower portion of the image sensor 31b. A brighter image of an imaging object is captured as the imaging object is closer to the imaging unit 3, and a darker image of the imaging object is captured as the imaging object is farther from the imaging unit 3. Thus, a part (in the near field) in focus in the upper portion of the image sensor 31b is brighter than a part (in the far field) in focus in the lower portion of the image sensor 31b. Conversely, the part (in the far field) in focus in the lower portion of the image sensor 31b is darker than the part (in the near field) in focus in the upper portion of the image sensor 31b.

Figure 9:
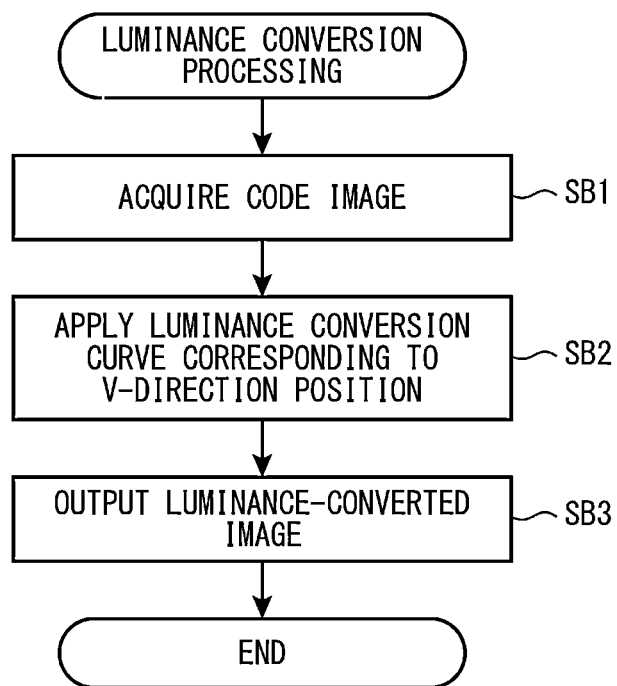
FIG. 9 is a flowchart illustrating a first example of luminance conversion processing.

Details of the luminance conversion processing in Step SA2 will be described with reference to a first example of the luminance conversion processing illustrated in FIG. 9. The luminance conversion processing can be executed using, for example, the pre-processing circuit 32, but may be executed using another integrated circuit. Although a case where the luminance conversion processing is executed by the code detection unit 43 will be described in the following description, the luminance conversion processing may be executed by the pre-processing circuit 32. In this case, a code image subjected to the luminance conversion processing by the pre-processing circuit 32 is output to the code detection unit 43. In addition, the code detection unit 43 may include the pre-processing circuit 32. In this case, the luminance conversion processing is executed by the pre-processing circuit 32 which is a part of the code detection unit 43, and the code detection unit 43 detects a code candidate position based on a code image on which the luminance conversion processing has been executed.

Figure 10A:
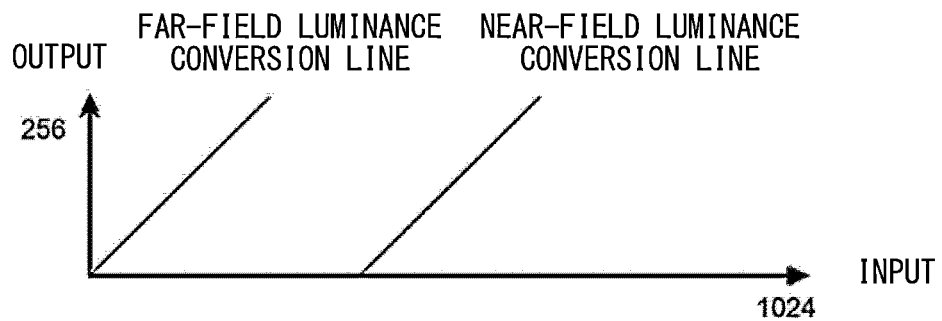
FIGS. 10A, 10B, and 10C are views illustrating examples of luminance conversion curves different from each other.
Figure 10B:
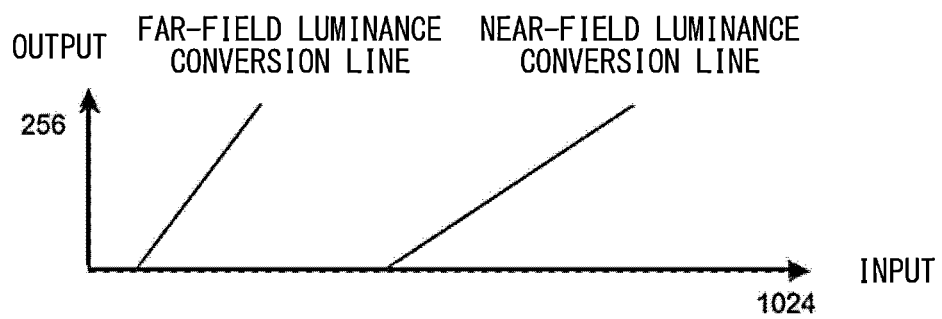
Figure 10C:
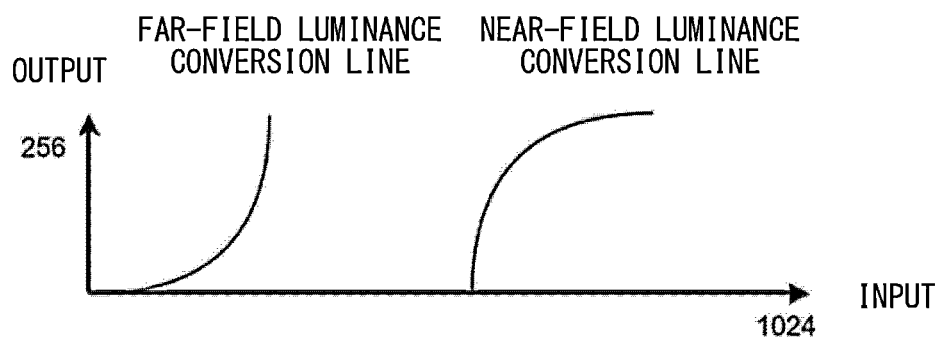

In Step SB1, the imaging control unit 41 causes the imaging unit 3 to generate a code image, and the code detection unit 43 acquires the code image generated by the imaging unit 3. In Step SB2, the code detection unit 43 applies a luminance conversion curve corresponding to a V-direction position of the image sensor 31b to the code image acquired in Step SB1. Examples of the luminance conversion curve are illustrated in FIGS. 10A, 10B, and 10C, in which a horizontal axis represents an input with respect to the code detection unit 43 and a vertical axis represents an output from the code detection unit 43. The luminance conversion processing may be a linear conversion processing as illustrated in a graph of FIG. 10A and a graph of FIG. 10B, or the luminance conversion processing may be a non-linear conversion processing as illustrated in a graph of FIG. 10C. The code detection unit 43 changes the luminance conversion curve according to a position (reference focal position) where a code to be read is present in the code image, that is, the V-direction position of the image sensor 31b. For example, the code detection unit 43 applies a luminance conversion curve to the code image so as to obtain a code image having optimum contrast for reading the code to be read. In addition, the code detection unit 43 applies a luminance conversion curve to the code image so as to obtain a code image having an optimum dynamic range for reading the code to be read. As illustrated in FIGS. 10A to 10C, a black level for setting a pixel value of an output image to zero is changed between the far field and the near field. Since an input pixel value at a V-direction position where focus is achieved in the near field is brighter than an input pixel value at a V-direction position where focus is achieved in the far field, a luminance value of an input image for setting a pixel value of an output image to zero in the near field is offset toward a side where the input luminance value is higher than a luminance value of an input image for setting a pixel value of an output image is set to zero in the far field (black level offset). Therefore, it is possible to effectively prevent a luminance value of the output image from being saturated when the luminance value of the input image is bright at the V-direction position in the near field, and it is possible to increase a luminance value of the output image to appropriate brightness at the V-direction position in the far field.

Since it is possible to set the dynamic range based on the reference focal position and secure the contrast, it is also possible to cause blown-out highlights or crushed blacks at positions greatly deviated from the reference focal position. Therefore, it is possible to exclude a code at a place greatly deviated from the reference focal position from reading targets.

In Step SB3, a luminance-converted image generated by applying the luminance conversion curve in Step SB2 is output. Step SA1 illustrated in FIG. 8 and Steps SB1 to SB3 illustrated in FIG. 9 correspond to an imaging step.

Figure 11:
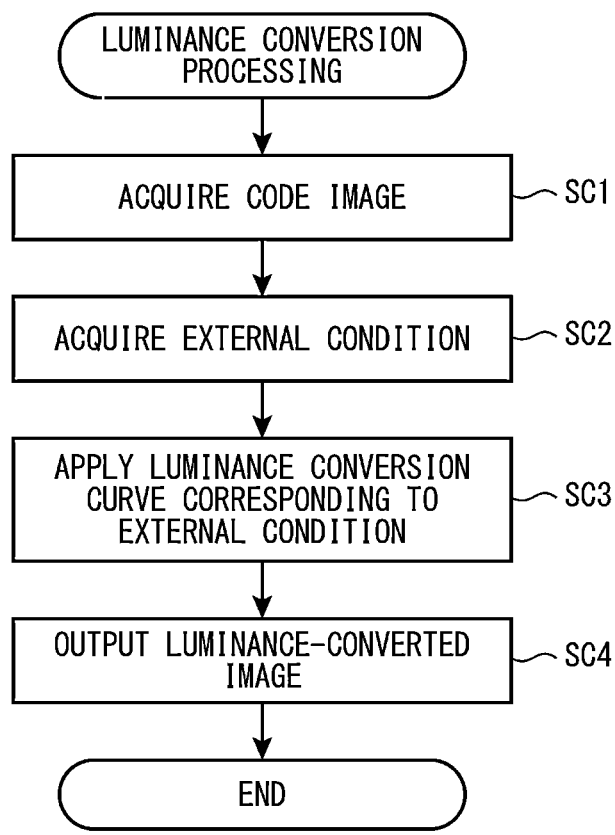
FIG. 11 is a flowchart illustrating a second example of the luminance conversion processing.

FIG. 11 illustrates a second example of the luminance conversion processing. Step SC1 is the same as Step SB1 illustrated in FIG. 9. In Step SC2, the code detection unit 43 acquires an external condition. Examples of the external condition include height data acquired by a distance sensor or the like that measures a height of the workpiece W (a height of a surface to which a code is attached). The code detection unit 43 can acquire the height of the surface to which the code is attached by acquiring the height data, and can estimate a reference focal position based on the acquired height.

In Step SC3, a luminance conversion curve corresponding to the external condition acquired in Step SC2 is applied to the code image. In a case where the height data of the surface to which the code is attached is acquired and the reference focal position is estimated, the luminance conversion curve is changed so as to obtain a dynamic range and contrast suitable for reading a code at the estimated reference focal position. In Step SC4, a luminance-converted image generated by applying the luminance conversion curve in Step SC3 is output. Step SA1 illustrated in FIG. 8 and Steps SC1 to SC4 illustrated in FIG. 11 correspond to the imaging step.

In addition, which part of the workpiece W is in a depth of field region of the imaging unit 3 changes depending on an imaging time, and thus, the imaging time may be acquired as the external condition, and the luminance conversion curve may be changed according to the imaging time.

A luminance conversion setting may be executed by tuning executed before the operation of the code reader 1. That is, the control unit 40 is configured to be capable of executing the tuning based on an instruction from a user. In the tuning, imaging and decoding processing are repeated while changing an illumination condition of the illumination unit 2, an imaging condition of the imaging unit 3, and a decoding condition of the decoding processing, and optimum imaging condition and decoding condition are determined based on matching levels each of which indicates the ease of code reading and is calculated under each of the illumination conditions, each of the imaging conditions, and each of the decoding conditions. More specifically, various conditions (tuning parameters) are set at the time of setting the code reader 1 so as to set conditions suitable for decoding by changing the imaging condition such as a gain and an exposure time of the imaging unit 3 and a light amount of the illumination unit 2, an image processing condition in the pre-processing circuit 32, a luminance conversion curve, and the like. The image processing condition in the pre-processing circuit 32 includes a coefficient of an image processing filter (the strength of the filter) and switching of image processing filters, a combination of different types of image processing filters, and the like when there are a plurality of image processing filters. The luminance conversion setting can also be performed when more appropriate imaging condition and image processing condition are searched for and each processing is set. Therefore, an optimum luminance conversion curve can be automatically set.

In addition, the user may manually set the optimum luminance conversion curve according to a height at which a code is attached. In this case, luminance-converted images are visually confirmed while changing luminance conversion curves, a luminance conversion curve is selected so as to obtain the optimum contrast or dynamic range for code reading, and the selected luminance conversion curve is registered.

When a luminance conversion curve is automatically set or manually set, the luminance conversion curve may be registered in a bank. In the present embodiment, for example, a bank in which parameters constituting the imaging condition of the imaging unit 3, parameters constituting a decoding processing condition or the like, and a luminance conversion curve type are set can be stored in the setting storage unit 53 of the storage unit 5. The bank can be referred to as a parameter set. A plurality of the banks are provided and respectively store different parameters. For example, a first imaging condition, a first code condition, and a first luminance conversion curve, and a second imaging condition, a second code condition, and a second luminance conversion curve set by the tuning are stored as different banks, respectively, in the setting storage unit 53.

The code reader 1 is configured to be capable of performing switching from one parameter set including the first imaging condition, the first code condition, and the first luminance conversion curve among the plurality of banks stored in the setting storage unit 53 to another parameter set including the second imaging condition, the second code condition, and the second luminance conversion curve, and performing the opposite switching. The switching of the parameter set can be also performed by the control unit 4, by the user, or by a switching signal from the external control device such as the PLC 201. In a case where the user switches a parameter set, for example, it is sufficient to operate a parameter set switching unit incorporated in a user interface. When the parameter set switching unit is set to "valid", a parameter set of a corresponding bank is used in the operation time of the code reader 1. In addition, when the parameter set switching unit is set to "invalid", a parameter set of a corresponding bank is not used in the operation time of the code reader 1. That is, the parameter set switching unit is configured to switch from one parameter set to another parameter set.

Figure 12:
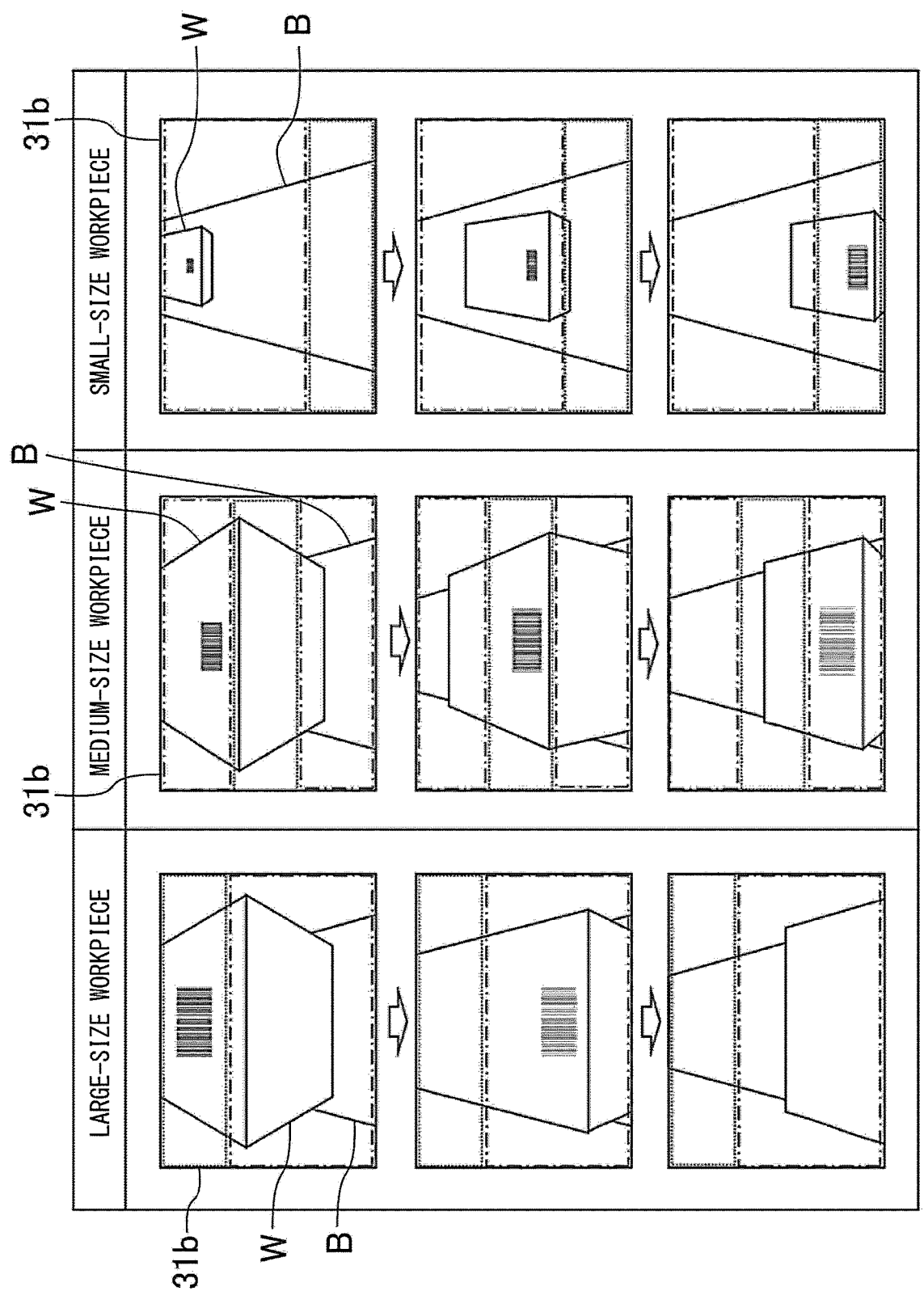
FIG. 12 is a view illustrating an example of luminance conversion.

FIG. 12 is a view illustrating an example of luminance conversion. In FIG. 12, a "large-size workpiece" is a workpiece having the highest height, a "medium-size workpiece" is a workpiece having a medium height, and a "small-size workpiece" is a workpiece having the lowest height. A state in which the workpiece W is conveyed from the upper side to the lower side in the drawing is illustrated, and a code is attached to an upper surface of each of the workpieces W.

In the case of the large-size workpiece, the code is in focus in an upper portion of the image sensor 31b, and thus, a luminance conversion curve is applied such that the optimum contrast or dynamic range for code reading is obtained in the upper portion of the image sensor 31b. In the case of the medium-size workpiece, the code is in focus in an intermediate portion of image sensor 31b in the up-down direction, and thus, a luminance conversion curve is applied such that the optimum contrast or dynamic range for code reading is obtained in the intermediate portion of image sensor 31b in the up-down direction. In the case of the small-size workpiece, the code is in focus in a lower portion of the image sensor 31*b*, and thus, a luminance conversion curve is applied such that the optimum contrast or dynamic range for code reading is obtained in the lower portion of the image sensor 31*b*.

When the luminance conversion processing in Step SA2 illustrated in FIG. 8 is completed as described above, the flow proceeds to Step SA3, and the code detection unit 43 executes code candidate position search processing. The code candidate position search processing corresponds to a code detection step of specifying a code region based on a code image output in the imaging step and detecting a code from the specified code region. This step is also a position determination step of determining a code candidate position in the code image output in the imaging step.

Figure 13:
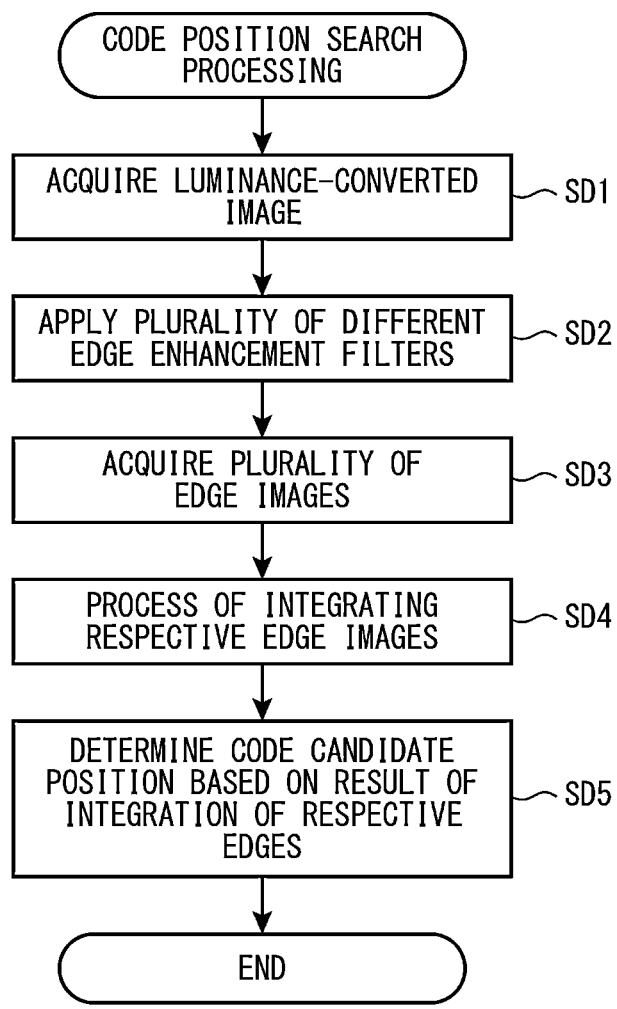
FIG. 13 is a flowchart illustrating a first example of code position search processing.
Figure 14:
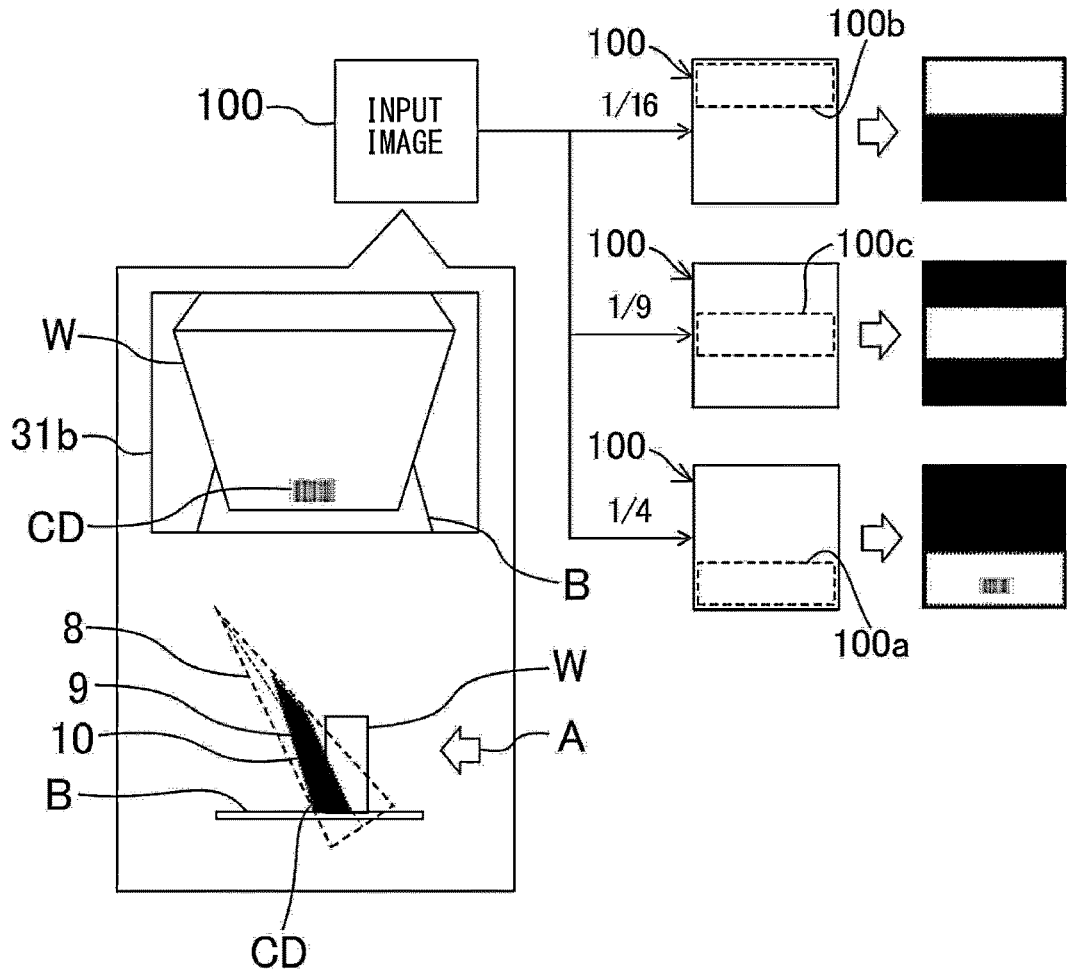
FIG. 14 is a view for describing a case where edge extraction processing is performed on each region of an input image with different kernel coefficients.

FIG. 13 is a flowchart illustrating a first example of the code candidate position search processing. In Step SD1, the luminance-converted image output in Step SB3 illustrated in FIG. 9 or Step SC4 illustrated in FIG. 11 is acquired. The luminance-converted image is a code image, and the code detection unit 43 extracts an edge based on the luminance-converted image, which is the code image, and specifies a region where the extracted edge is present as a code region. For example, as illustrated in FIG. 14, when a code CD is attached to a lower part of the workpiece W, a code image focused on the code CD is acquired in a lower portion of the image sensor 31*b*. In addition, as illustrated in FIG. 12, a code CD in the small-size workpiece W is in focus in the lower portion of the image sensor 31*b*, and a code CD in the medium-size workpiece W is in focus in the intermediate portion of the image sensor 31*b* in the up-down direction. That is, a position of the workpiece W appearing on the image sensor 31*b* changes depending on a distance between the workpiece W and the imaging unit 3, and the code detection unit 43 varies a code detection reference according to the position of the workpiece W appearing on the image sensor 31*b* that changes depending on the distance between the workpiece W and the imaging unit 3.

When specifying the code region, the code detection unit 43 specifies the code region based on evaluation values calculated from the code image. For example, the code detection unit 43 calculates the evaluation values from the code image such that a region having a lower edge frequency as compared with that in a case where the workpiece W is located in the far field is specified as the code region in a case where the workpiece W is located in the near field with respect to the imaging unit 3, and a region having a higher edge frequency as compared with that in a case where the workpiece W is located in the near field is specified as the code region in a case where the workpiece W is located in the far field with respect to the imaging unit 3.

When calculating the evaluation values, the code detection unit 43 suppresses an evaluation value for an edge in which the workpiece W is located in the near field with respect to the imaging unit 3 and luminance is relatively low as compared with an edge in which luminance is relatively high. Further, the code detection unit 43 calculates the evaluation values such that an evaluation value for an edge in which the workpiece W is located in the far field with respect to the imaging unit 3 and luminance is relatively high is suppressed as compared with an edge in which luminance is relatively low.

When calculating the evaluation values, in Step SD2, the code detection unit 43 may apply a plurality of different edge enhancement filters to the luminance-converted image acquired in Step SD1. Examples of the edge enhancement filter include a Sobel filter. For example, a composite image may be generated by adding images of the X-direction Sobel and the Y-direction Sobel if there is no premise for a rotation angle of a barcode or the X-direction Sobel and the Y-direction Sobel if the rotation angle of the barcode is 0° and 90°, respectively. In Step SD2, the code detection unit 43 applies a plurality of edge extraction filters for extracting edges of different frequencies to the code image to generate a plurality of edge images.

A code region to be read can also be stored in, for example, the storage unit 5. The code region to be read can be specified based on a part of the workpiece W to which the code is attached at the time of setting, and the specified code region to be read is stored in the storage unit 5, and an edge extraction filter to be applied to this code region to be read is also stored in the storage unit 5. In the operation time, the code detection unit 43 applies an edge extraction filter corresponding to a code region stored in the storage unit 5 to the corresponding code region of the code image.

In Step SD3, the code detection unit 43 acquires the plurality of edge images as a result of the processing in Step SD2. In Step SD4, the code detection unit 43 executes a process of integrating the plurality of edge images acquired in Step SD3. In Step SD4, the code detection unit 43 determines a code candidate position based on a result of the process of integrating the respective edges. That is, in an edge-processed image, a region where many pixels having high luminance values gather can be estimated as the code region.

For example, the code detection unit 43 can generate a heat map image indicating the likelihood of the code in order to search for a position of the code in the code image. That is, the code detection unit 43 quantifies a characteristic amount of the code, generates a heat map in which the magnitude of the characteristic amount is assigned to each pixel value, and extracts a code candidate region in which the code is highly likely to be present on the heat map. As a specific example, there is a method of acquiring a characteristic part of a code in a region that is relatively hot (has a large characteristic amount) in a heat map. In a case where a plurality of characteristic parts are acquired, the characteristic parts can be extracted according to priorities and stored in a RAM or the like. When the heat map image is used, the code region can be detected at high speed.

When the heat map image is to be generated, a process of integrating pieces of neighboring edge data is executed in order to express a region where many pixels having high luminance values gather. For example, the integration process can be performed using a smoothing process that has an effect of adding pixel values within a specific window size. A reduction process may be used instead of the smoothing process.

Here, in the case of the same code, edge information has frequency characteristics in which the frequency is lower in the near field than in the far field, and is higher in the far field than in the near field. The code detection unit 43 can be configured to increase an evaluation value for a code closer to a depth-of-field region by weighting or simplifying edge data of a code image based on a V-direction position and a reference frequency characteristic thereof.

As an example of such a configuration, the code detection unit 43 applies a plurality of edge extraction filters for extracting edges of different frequencies to the code image to generate a plurality of edge images, and specifies a code region based on the generated edges of the edge images. Specifically, the code detection unit 43 applies, to the code image, a first edge extraction filter for extracting an edge region having a relatively high frequency and a second edge extraction filter for extracting an edge region having a relatively low frequency. The code detection unit 43 detects a code located in the far field with respect to the imaging unit 3 by applying the first edge extraction filter to the code image, and detects a code located in the near field with respect to the imaging unit 3 by applying the second edge extraction filter to the code image.

The code detection unit 43 is configured to perform edge extraction with a kernel coefficient for extracting an edge region having a relatively low frequency with respect to a position where the workpiece W appears in the image sensor 31*b* in a case where the workpiece W is located in the near field with respect to the imaging unit 3, and to perform edge extraction with a kernel coefficient for extracting an edge region having a relatively high frequency with respect to a position where the workpiece W appears in the image sensor 31*b* in a case where the workpiece W is located in the far field with respect to the imaging unit 3.

As illustrated in FIG. 14, a lower part 100*a* of an input image 100 is a part in which the workpiece W appears in the case where the workpiece W is located in the far field with respect to the imaging unit 3, and edge extraction is performed on the lower part 100*a* of the input image 100 with a kernel coefficient of ¼, for example, as the kernel coefficient for extracting an edge region having a relatively high frequency. This edge extraction filter can also be referred to as a long-distance edge extraction filter.

On the other hand, an upper part 100*b* of the input image 100 is a part in which the workpiece W appears in a case where the workpiece W is located in the near field of the imaging unit 3, and edge extraction is performed on the upper part 100*b* of the input image 100 with a kernel coefficient of ¹⁄₁₆, for example, as the kernel coefficient for extracting an edge region having a relatively low frequency. This edge extraction filter can also be referred to as a short-distance edge extraction filter.

In addition, an intermediate part 100*c* of the input image 100 in the up-down direction is a part in which the workpiece W appears in a case where the workpiece W is located between the far field and the near field with respect to the imaging unit 3, and edge extraction is performed on the intermediate part 100*c* of the input image 100 with a kernel coefficient of ⅑ as an intermediate kernel coefficient. This edge extraction filter can also be referred to as an intermediate-distance edge extraction filter. The kernel coefficients used in the long-distance edge extraction filter, the short-distance edge extraction filter, and the intermediate-distance edge extraction filter are examples, and coefficients different from the above examples may be used.

Figure 15:
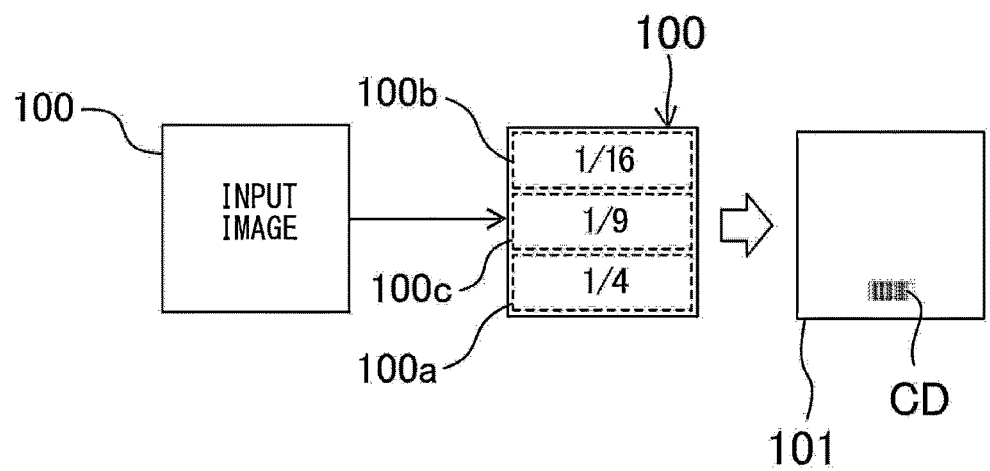
FIG. 15 is a view according to a modified example of an example illustrated in FIG. 14.

FIG. 15 illustrates a modified example of the example illustrated in FIG. 14. That is, the plurality of edge extraction filters having the different kernel coefficients may be applied as illustrated in FIG. 14, or an edge extraction filter having different kernel coefficients according to positions may be applied as illustrated in FIG. 15. In the example illustrated in FIG. 14, it is not necessary to generate an edge-integrated image, and it is sufficient that the code candidate region is extracted in any image. Note that the edge-integrated image may be generated in the example illustrated in FIG. 14.

In the example illustrated in FIG. 15, edge extraction processing is performed with kernel coefficients different from each other among the lower part 100*a*, the upper part 100*b*, and the intermediate part 100*c* of the input image 100, thereby obtaining an edge-integrated image 101 in which edges are integrated. Note that the input image 100 may be divided into two parts, and in this case, edge extraction processing is executed with kernel coefficients different from each other between an upper part and a lower part.

Figure 16:
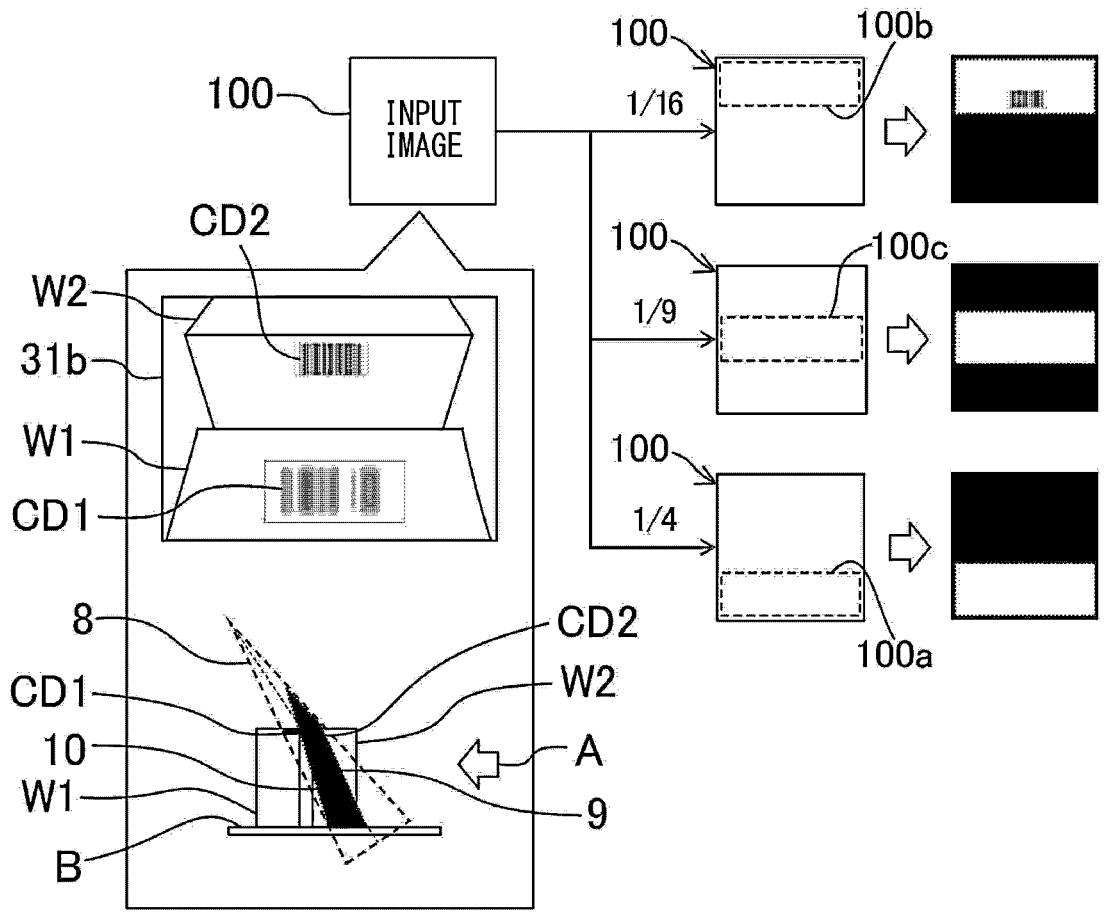
FIG. 16 is a view for describing another example of the case where the edge extraction processing is performed on each region of an input image with different kernel coefficients.
Figure 17:
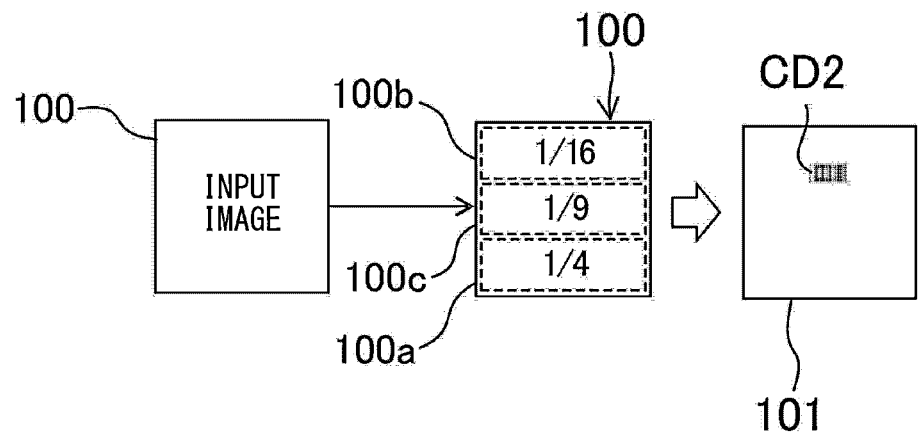
FIG. 17 is a view according to a modified example of the example illustrated in FIG. 16.

FIG. 16 illustrates a case where two workpieces W1 and W2 are conveyed in the state of being close to each other in the conveying direction. FIG. 17 illustrates a modified example of an example illustrated in FIG. 16. FIGS. 16 and 17 have the same relationship as FIGS. 14 and 15, and a plurality of edge extraction filters having different kernel coefficients may be applied as illustrated in FIG. 16, or an edge extraction filter having different kernel coefficients according to positions may be applied as illustrated in FIG. 17.

In the example illustrated in FIG. 16, heights of codes CD1 and CD2 attached to the two workpieces W1 and W2 are substantially the same. Since the code CD1 of the workpiece W1 located on the downstream side in the conveying direction is located outside a region 9 in focus of the image sensor 31*b*, the code CD1 of the workpiece W1 is blurred on the image sensor 31*b*. Since the code CD2 of the workpiece W2 located on the upstream side in the conveying direction is inside the region 9 in focus of the image sensor 31*b*, the code CD2 of the workpiece W2 is in focus on the image sensor 31*b*. When edge extraction is performed on a lower part 100*a*, an upper part 100*b*, and an intermediate part 100*c* of an input image 100 with the above-described kernel coefficients, an edge of the blurred code CD1 is not extracted, an edge of the code CD2 is enhanced, and an edge-integrated image 101 can be generated in the example illustrated in FIG. 17.

Thereafter, the flow proceeds to Step SD5 in FIG. 13. In Step SD5, the code detection unit 43 determines a code candidate position based on a result of integration of the respective edges. The edge-integrated images 101 illustrated in FIGS. 15 and 17 are images indicating the edge integration results. In the edge-integrated image 101 of FIG. 15, a central portion of the lower part in the left-right direction is specified as a code region. In the edge-integrated image 101 of FIG. 17, a central portion of the upper part in the left-right direction is specified as a code region.

Figure 18:
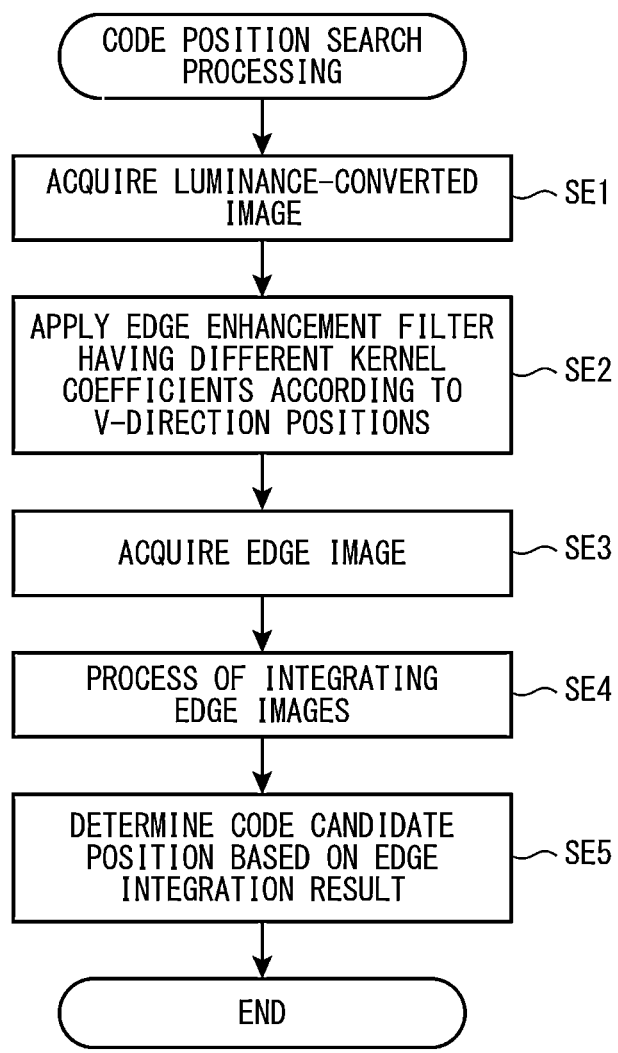
FIG. 18 is a flowchart illustrating a second example of the code position search processing.

A case where the edge enhancement filter having different kernel coefficients is applied will be described with reference to a flowchart illustrated in FIG. 18. Step SE1 is the same as Step SD1 in FIG. 13. In Step SE2, the edge enhancement filter having different kernel coefficients according to V-direction positions of the image sensor 31*b* is applied as illustrated in FIGS. 14 to 17 described above. Steps SE3 to SE5 are the same as Steps SD3 to SD5 in FIG. 13, respectively.

When the code candidate position search ends, the flow proceeds to Step SA4 of the flowchart illustrated in FIG. 8. In Step SA4, it is determined whether or not the code candidate position has been successfully detected as a result of the code candidate position search in Step SA3. In a case where the detection of the code candidate position has failed, the flow proceeds to Step SA1. In a case where the code candidate position has been successful detected, the flow proceeds to Step SA5, and the decoding unit 44 decodes a code detected in the code detection step. Step SA5 corresponds to a decoding step. With the above configuration, it is possible to automatically detect the region where the code is present and to perform high-speed reading even if a sensor for measuring a dimension of a workpiece, such as a dimension measuring sensor, is not provided.

Figure 19:
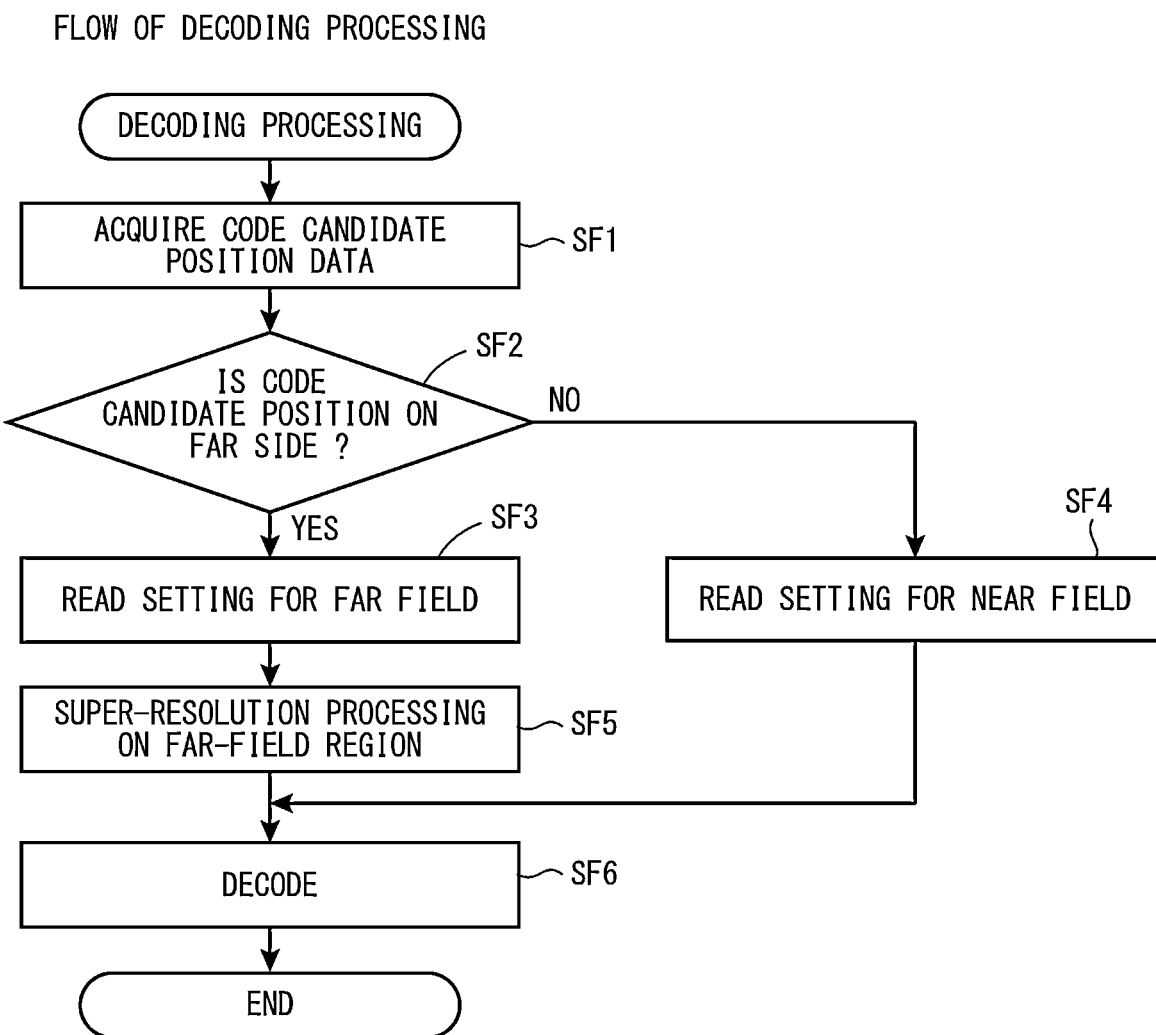
FIG. 19 is a flowchart illustrating an example of decoding processing.

FIG. 19 is a flowchart illustrating an example of the decoding processing. In Step SF1, the decoding unit 44 acquires code candidate position data searched in Step SA3. In Step SF2, the decoding unit 44 determines whether or not the code candidate position is on the far side based on the code candidate position data acquired in Step SF1. In a case where the code candidate position is present in the lower part 100a of the input image 100 as illustrated in FIGS. 14 and 15, it is determined that the code candidate position is located on the far side. On the other hand, in a case where the code candidate position is present in the upper part 100b of the input image 100 as illustrated in FIGS. 16 and 17, it is determined that the code candidate position is not located on the far side.

When it is determined as YES in Step SF2 and the code candidate position is located on the far side, the flow proceeds to Step SF3, and the decoding unit 44 reads a setting for the far field from the setting storage unit 53 of the storage unit 5. When it is determined as NO in Step SF2 and the code candidate position is not located on the far side, the flow proceeds to Step SF4, and the decoding unit 44 reads a setting for the near field from the setting storage unit 53 of the storage unit 5. The setting for the far field and the setting for the near field include a code size (an upper limit and a lower limit), contrast (a black-and-white threshold), and the like. That is, the setting for the near field and the setting for the far field each include at least any item of a code size to be decoded, an inclination of a code, a reference value of brightness to be decoded, and contrast, and characteristics of a code to be decoded may be different between the case of being located in the near field and the case of being located in the far field. Even for codes having the same actual size, a size, an inclination, brightness, and contrast in a code image change depending on whether an appearing position in the code image is on a near side or a far side, and thus, this configuration enables an appropriate decoding target to be set according to the position, and improves the reading efficiency.

An upper limit of the code size to be decoded included in the setting for the far field is smaller than an upper limit of the code size to be decoded included in the setting for the near field, and in a case where the setting for the far field is selected, the control unit 4 may execute decoding processing of a code having a relatively small size as compared with the setting for the near field. In a standard distribution code used for distribution between companies, ranges of basic sizes are defined in advance in the international standard. In addition, a code having the same size appears to be smaller on an image in the case of being located on the far side than on the near side. Therefore, since a code size appearing on the far side can be predicted to some extent, the improvement in the efficiency of the decoding processing can be expected by setting the upper limit of the code size to be smaller so as to read a code having a relatively small size in the setting for the far field.

In addition, a contrast value included in the setting for the far field is lower than a contrast value included in the setting for the near field, and in a case where the setting for the far field is selected, the control unit 4 may execute decoding processing of a code having a relatively low contrast value as compared with the setting for the near field. In addition, a reference value of brightness to be decoded included in the setting for the far field is lower than a reference value of brightness to be decoded included in the setting for the near field, and in a case where the setting for the far field is selected, the control unit 4 may execute decoding processing of a code having relatively low brightness as compared with the setting for the near field. The far side has a longer distance, and thus, is likely to be relatively darker than the near side of the imaging unit 3. That is, the improvement in the efficiency of the decoding processing can be expected by setting the contrast value and the reference value of brightness of the code to be lower so as to read a code having a relatively low contrast value or a code having a relatively low brightness in the setting for the far field. An inclination of a code varies depending on whether the code is attached to a front surface of a workpiece or an upper surface of the workpiece. That is, an inclination of a code increases as the position is closer to the far side if the code is attached to a front surface of a workpiece, and an inclination of a code decreases as the position is closer to the farther side if the code is attached to an upper surface of a workpiece. Therefore, if it is possible to determine whether a code is attached to an upper surface or a front surface of a workpiece based on a detection timing by the object detection sensor and a conveying speed of a conveying device, the code reader 1 can select an appropriate inclination of the code based on a result of the determination.

Figure 30:
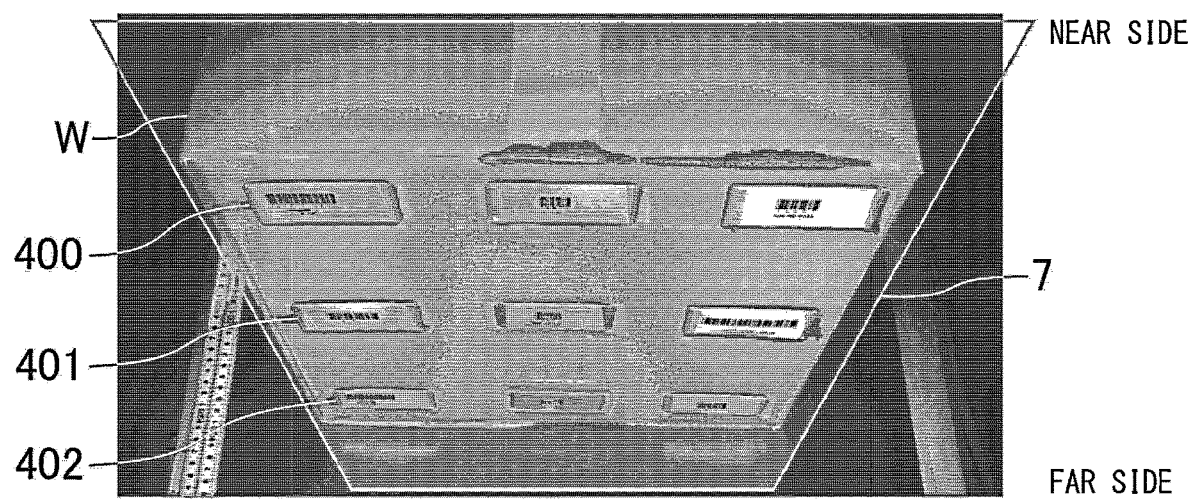
FIG. 30 is a view illustrating an example of a code image generated by the code reader according to another embodiment.

In addition, in a case where a code image includes a near code located closer to the near field than the far field and a far code located closer to the far field than the near field, the control unit 4 executes decoding processing of the far code based on the setting for the far field, and executes decoding processing of the near code based on the setting for the near field. For example, in a case where the near code and the far code appear in an upper section and a lower section of a front surface of one workpiece, respectively, as illustrated in FIG. 30, the reading efficiency is improved by executing the decoding processing suitable for each of the positions.

This step is a selection step of selecting, based on the code candidate position determined in the position determination step, either the setting for the near field to be used for the decoding processing of a code located in the near field with respect to the imaging unit 3 or the setting for the far field to be used for the decoding processing of the code located in the far field with respect to the imaging unit 3.

After reading the setting for the far field in Step SF3, the flow proceeds to Step SF5, and the decoding unit 44 executes super-resolution processing on a far-field region, that is, the lower part 100a of the input image 100. That is, since the lower part 100a of the input image 100 is the far-field region, even the same code as a code present in a near-field region appears to be smaller. When the super-resolution processing is executed on the lower part 100a of the input image 100 that corresponds to the code in the far-field region appearing to be smaller, it is possible to improve decoding processing capability to be described. On the other hand, since the code appears to be larger in the upper part 100b of the input image 100 where the code present in the near-field region is in focus, the super-resolution processing is not executed on the upper part 100b of the input image 100. Therefore, high-speed and high-precision decoding can be executed. The super-resolution processing may be executable on the upper part 100b of the input image 100. Therefore, it is possible to solve a problem that it takes time with conventional methods, such as a method of performing super-resolution processing on the entire image or a method of attempting decoding with a low-resolution image and decoding only a code part again with the original resolution in a case where decoding has failed.

In this manner, the control unit 4 determines the code candidate position in the code image for the code image output from the imaging unit 3, selects the setting for the near field or the setting for the far field from the setting storage unit 53 of the storage unit 5 based on the determined code candidate position, and executes the decoding processing on the code image using the selected setting. Therefore, the appropriate setting is applied to each of a code on the far side and a code on the near side, and the decoding processing (decoding step) is executed.

In addition, the execution or non-execution of the super-resolution processing may be automatically determined according to a code size. For example, at the time of setting, the user sets a code size to be read in advance, and setting information of the code size is stored in the storage unit 5. In the operation time, the decoding unit 44 reads the setting information of the code size from the storage unit 5, specifies a region where the super-resolution processing is to be executed, and executes the super-resolution processing on the specified region.

The storage unit 5 can set the region where the super-resolution processing is executed as an execution region of the super-resolution processing, and store the execution region of the super-resolution processing as setting information. That is, the execution region of the super-resolution processing is a region corresponding to the far-field region of the code image, and this region can be stored as the setting information. When the setting for the far field has been selected, the control unit 4 reads the execution region of the super-resolution processing from the storage unit 5 and executes the super-resolution processing on the execution region.

In addition, not only the super-resolution processing but also optimization of the upper limit value and the lower limit value of the size of the code to be decoded, the inclination of the code, or the reference value of brightness to be decoded may be performed.

In Step SF6, the decoding unit 44 decodes the code present at the code candidate position.

When the decoding has been performed by the decoding unit 44, the flow proceeds to Step SA6 returning to the flowchart of FIG. 8. In Step SA6, the decoding unit 44 determines whether or not the decoding in Step SA5 is successful. In a case where it is determined that the decoding has failed, the flow proceeds to Step SA7, and it is determined whether or not there is another code candidate position (code candidate position that is not attempted to be decoded) searched in Step SA3. In a case where there is another code candidate position, the flow proceeds to Step SA5, and the decoding unit 44 decodes a code present at the other code candidate position. In a case where there is no other code candidate position, the flow proceeds to Step SA1.

In a case where it is determined in Step SA6 that the decoding is successful, the flow proceeds to Step SA8, and the decoding unit 44 calculates a misassignment risk level based on a result of the decoding. The misassignment risk level is also referred to as a jamming risk level, and is an index for evaluating whether or not a code has been decoded in a depth-of-field region. The misassignment risk level is the evaluation index defined by edge data, a luminance value, a workpiece conveying position, brightness, a geometric shape of the code, a position of the code, or the like.

For example, in the example illustrated on the left of FIG. 16, the imaging unit 3 capture an image of the plurality of workpieces (W1 and W2) moving adjacent to each other on the conveyor B to generate the input image 100 (code image) in which the plurality of codes including the codes (CD1 and CD2) attached to the workpieces, respectively. The control unit 4 executes the decoding processing on the code image.

For example, the control unit 4 can specify the target workpiece W2 located in the depth of field region 9 at a point in time when the code image 100 is captured based on an elapsed time from a time at which the workpiece is detected by the object detection sensor (not illustrated) upstream of the code reader 1 to a time at which the code image 100 is captured and a conveying speed of the conveyor B. The control unit 4 calculates an index for evaluating whether or not a code has been decoded in the depth of field region 9 for the code that has been decoded based on information (for example, at least any of edge data, a luminance value, a workpiece conveying position at a point in time of capturing the code image, a geometric shape of the code, and a position of the code in the workpiece) obtained from the code image.

In the example illustrated on the left of FIG. 16, the control unit 4 determines that the assignment of the code CD2 having a relatively high possibility of having been decoded in the depth-of-field region 9 to the target workpiece W2 is accurate according to the index. On the other hand, even if the control unit 4 regards that the code CD1 included in the code image has been also decoded, the code CD1 is evaluated to have a relatively low possibility of having been decoded in the depth-of-field region 9 based on edge data, a luminance value, a geometric shape, or a pasting position in the workpiece W1 of the code CD1 obtained from the code image, a conveying position of the workpiece W1 at a point in time of capturing the code image, or the like. Therefore, even when the code CD1 has been assigned to the workpiece W2, the control unit 4 can determine that the code CD1 is assigned to the wrong workpiece W2. That is, the control unit 4 can determine that the assignment of the code CD1 to the workpiece W2 is inaccurate. The control unit 4 executes the above determination, for example, by comparing the calculated index with a predetermined threshold stored in the storage unit 5. In addition, the control unit 4 can also perform control so as to prevent the code CD1 from being assigned to the workpiece W2 in the first place.

When the relatively narrow depth-of-field region formed by the Scheimpflug optical system and the index are combined in this manner, it is possible to solve a problem that processing in the subsequent stage becomes wrong processing because a code is assigned to a workpiece on the downstream side even though the code attached to a workpiece on the upstream side in the conveying direction has been read in a case where an interval between the workpieces conveyed by the conveyor in the distribution site is narrow.

The control unit 4 may calculate the index such that a possibility that a code to which decoding processing has been applied in a code image is the code that has been decoded in the depth-of-field region 9 increases as a differential value between luminance values of the code image is larger, or as a difference between the maximum value and the minimum value of luminance values of luminance values in a partial region of the code image is larger. The larger the differential value between luminance values of the code image (a gradient of the luminance value between adjacent pixels) or the difference between the maximum value and the minimum value of luminance values (which are not limited to luminance values of adjacent pixels) in the partial region (that is, the code candidate region) in the code image, the higher the possibility of being an image with an enhanced edge. Thus, it is possible to accurately evaluate whether or not the code has been subjected to imaging and decoding in the depth of field region 9.

The control unit 4 may calculate the index such that the possibility that a code to which decoding processing has been applied in a code image is the code that has been decoded in the depth-of-field region 9 increases as a luminance value of the code image increases. The higher the luminance value of the code image, the higher the possibility of being an in-focus image. Thus, it is possible to accurately evaluate whether or not the code has been subjected to imaging and decoding in the depth-of-field region 9.

The control unit 4 may calculate the index such that a possibility that a code to which decoding processing has been applied in the code image is the code that has been decoded in the depth-of-field region 9 is high in a case where at least a part of a workpiece is included in the depth-of-field region 9 at a point in time when a code image is captured. For example, if a signal received from the object detection sensor upstream of the code reader is used, an elapsed time from a detection time at which the workpiece is detected to a time at which the code image is captured is obtained. Since a conveying position of the workpiece at a point in time when the code image is captured can be estimated based on a position of the object detection sensor, the elapsed time, and the conveying speed of the conveyor B, it is possible to accurately evaluate whether or not the code has been subjected to imaging and decoding in the depth-of-field region 9 if it can be determined that at least a part of the workpiece is included in the depth-of-field region 9 at the point in time when the code image is captured. For example, the object detection sensor detects a front surface (the conveying direction is assumed as the front) of the workpiece as a specific position of the workpiece, and the control unit 4 can estimate a current position of the specific position of the workpiece based on the elapsed time from the detection time and the conveying speed. Since the depth of field region 9 has been specified when the code reader 1 is installed, a code decoded at a certain timing can be determined to be the code attached to the workpiece whose specific position is included in the depth of field region 9 at that timing.

The control unit 4 may calculate the index such that the possibility that a code to which decoding processing has been applied in a code image is the code that has been decoded in the depth of field region 9 increases as a shape of the code included in the code image is closer to a rectangle. As the shape of the code included in the code image is closer to the rectangle, the code is in a state in which the imaging unit and the workpiece more directly oppose each other. Thus, it is possible to accurately evaluate whether or not the code has been subjected to imaging and decoding in the depth-of-field region 9.

The control unit 4 may calculate the index such that the possibility that a code to which decoding processing has been applied in a code image is the code that has been decoded in the depth-of-field region 9 increases as contrast of the code image increases. The higher the contrast of the code image, the higher the possibility of being an in-focus image. Thus, it is possible to accurately evaluate whether or not the code has been subjected to imaging and decoding in the depth-of-field region 9.

The evaluation index may be calculated based on the code image that has been successfully read, or may be calculated based on a temporal change of the code image, for example, a change from a state in which there are many high frequency components to a state in which there are few high frequency components. Specifically, the control unit 4 may calculate the index based on a change between a first code image and a second code image generated after the first code image, calculate the index such that a possibility that a code of the second code image is the code that has been decoded in the depth-of-field region increases as high frequency components of the second code image are more than high frequency components of the first code image, and calculate the index such that the possibility that the code of the second code image is the code that has been decoded in the depth of field region 9 decreases as the high frequency components of the second code image are fewer than the higher frequency components of the first code image. For example, a barcode has a configuration in which black (a bar) and white (a space) are alternately aligned, and thus, in a case where the barcode is included in an image, a high frequency component in the image is likely to be higher. Therefore, it is possible to accurately evaluate whether or not the code has been subjected to imaging and decoding in the depth-of-field region 9 even by a change in the high frequency component in the image.

This step is a calculation step of calculating an index for evaluating whether or not a code to which decoding processing has been applied is a code that has been decoded in a depth-of-field region formed by the Scheimpflug optical system 31 to be substantially perpendicular to a conveying surface of the conveyor B based on a result of the decoding processing.

Thereafter, the flow proceeds to Step SA9, and the decoding unit 44 determines whether or not misassignment has occurred. That is, after executing decoding processing, the decoding unit 44 of the control unit 4 calculates an index for evaluating whether or not a code to which the decoding processing has been applied is the code that has been decoded in the depth of field region formed by the Scheimpflug optical system 31 to be substantially perpendicular to the conveying surface of the conveyor B based on a result of the decoding processing. Then, the decoding unit 44 determines whether or not the code is assigned to a wrong workpiece based on the calculated index. This step is a determination step of determining whether or not the code is assigned to the wrong workpiece W based on the index calculated in the calculation step.

In a case where misassignment has occurred, the flow proceeds to Step SA10, and the decoding unit 44 notifies the user of a misassignment error via the communication unit 6. That is, the code reader 1 is configured to be capable of outputting an error signal when the decoding unit 44 determines that the code is assigned to the wrong workpiece W. If no misassignment occurs, the flow proceeds to Step SA11, and the decoding unit 44 outputs read data (a decoding result) via the communication unit 6.

(Process of Associating Code and Workpiece)

Figure 20A:
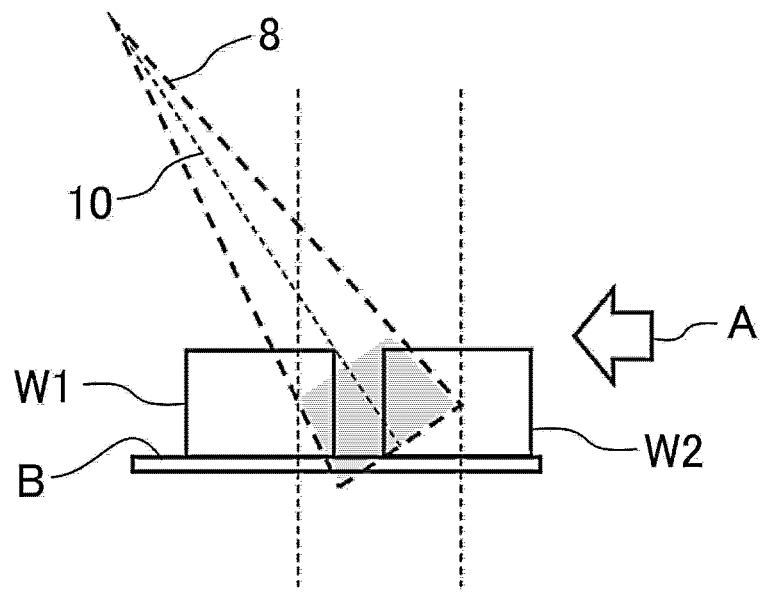
FIG. 20A is a view illustrating a case where two workpieces enter the visual field range of the imaging unit.
Figure 20B:
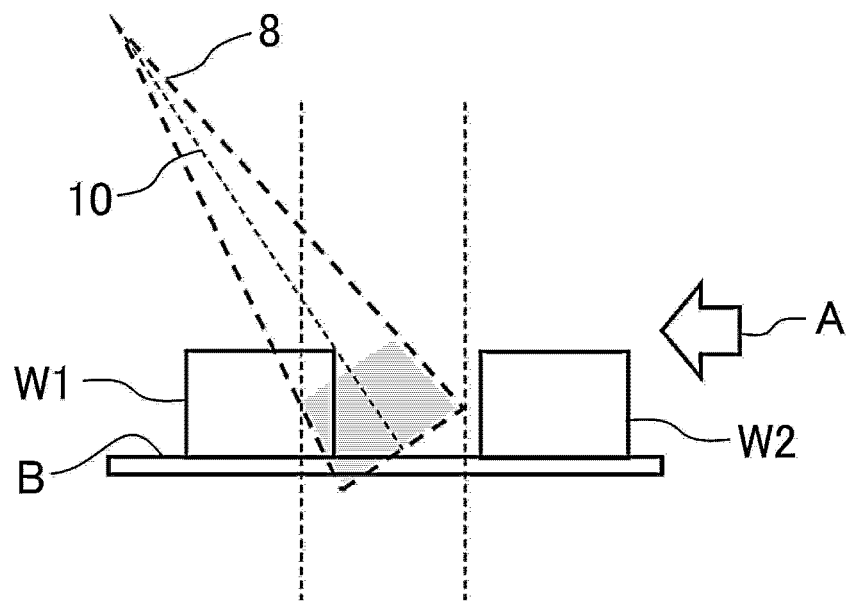
FIG. 20B is a view illustrating a case where a distance between the workpieces is enlarged such that one workpiece enters the visual field range of the imaging unit.

FIG. 20A illustrates a state in which an interval between the two workpieces W1 and W2 is narrow and the two workpieces W1 and W2 enter the visual field range 8 of the imaging unit 3. It is difficult to determine any of the workpieces W1 and W2 to which a code read at this timing should be assigned. As one of countermeasures, for example, a method is conceivable in which a coordinate of a read code is calculated, and the code and a workpiece are associated with each other using the calculated coordinate of the code. In this case, however, a plurality of workpieces in the same visual field are identified by coordinates, so that a risk of misassignment remains due to installation accuracy or the like. In order to reduce this risk, it is necessary to perform a process of increasing a distance between the workpiece W1 and the workpiece W2 as illustrated in FIG. 20B. In such a case, however, the number of workpieces that can be handled per unit time decreases, and it is difficult to say that it is an appropriate countermeasure in the distribution site.

Figure 21:
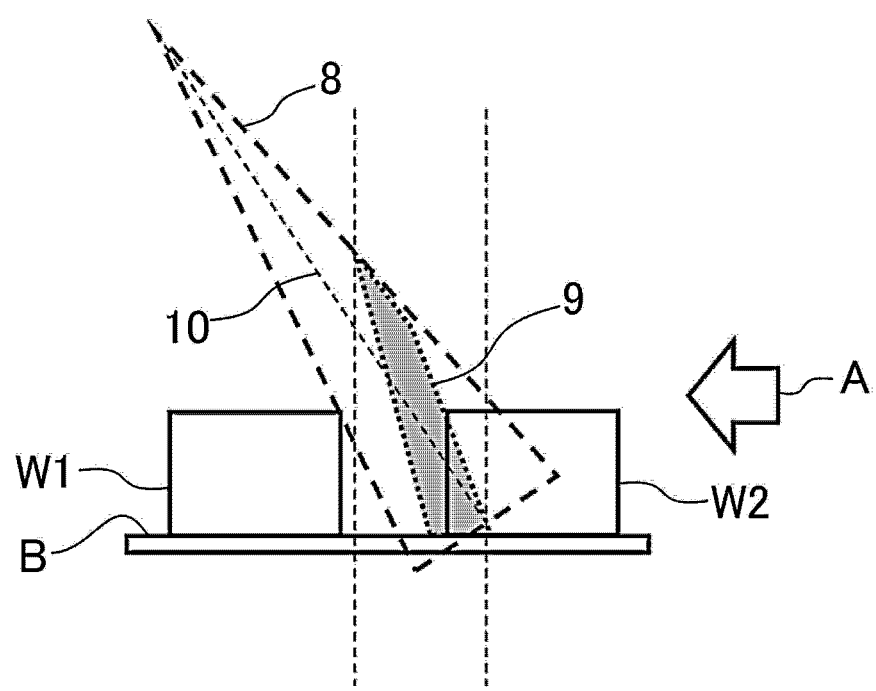
FIG. 21 is an explanatory view in a case where a process of associating a code and a workpiece is executed.

On the other hand, in the present embodiment, as illustrated in FIG. 21, the depth of field of the imaging unit 3 is set in the direction perpendicular to or almost perpendicular to the conveying direction of the workpieces W1 and W2 to enable the process of associating a code and a workpiece. Then, a misassignment risk is evaluated based on the misassignment risk level calculated in Step SA8 of the flowchart illustrated in FIG. 8.

Figure 22:
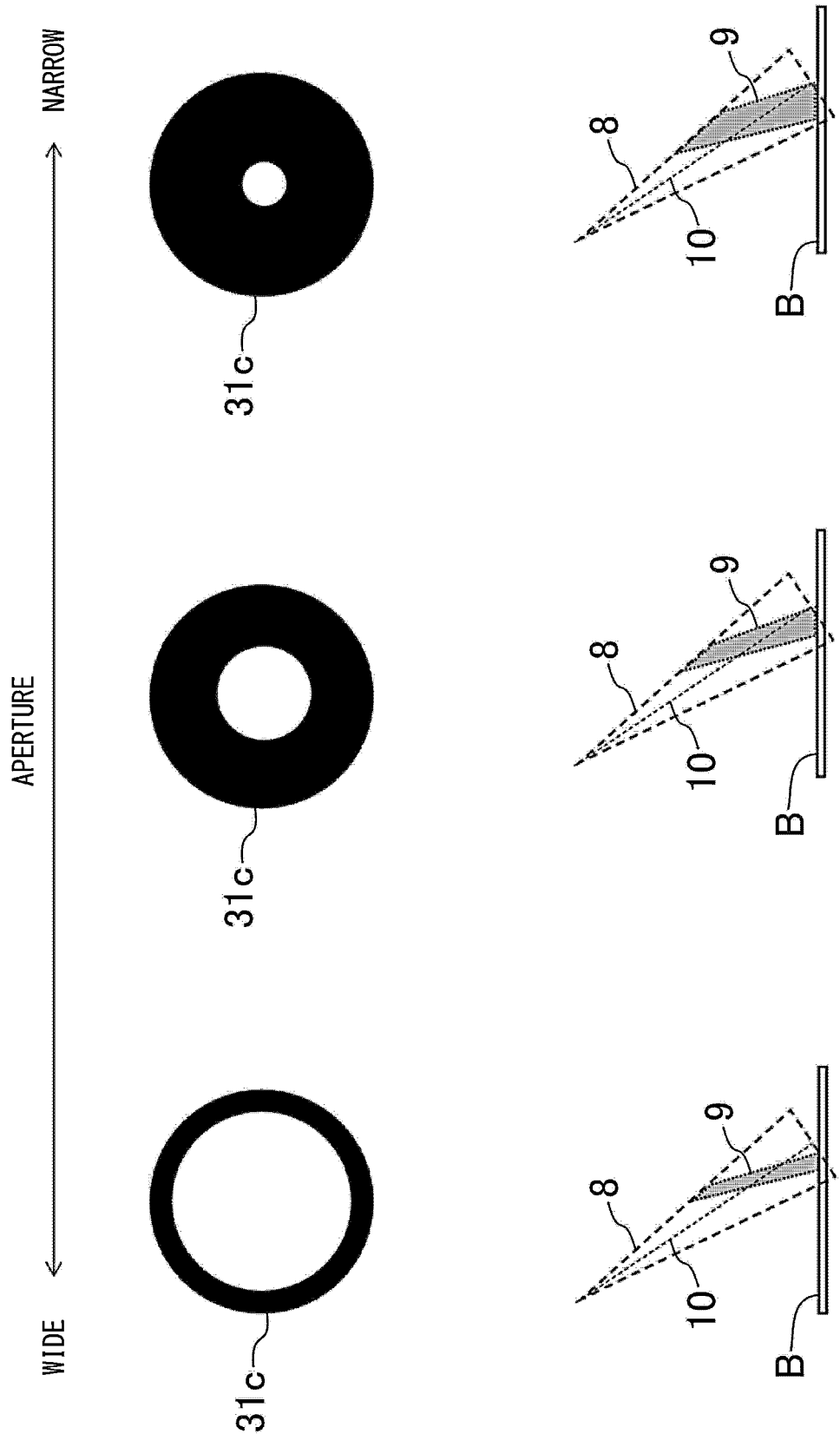
FIG. 22 is an explanatory view in a case where a depth-of-field region is changed by an automatic aperture adjustment mechanism.

In addition, as illustrated in FIG. 22, the imaging unit 3 may include an automatic aperture adjustment mechanism 31c. The automatic aperture adjustment mechanism 31c is provided between the lens 31a and the image sensor 31b, for example, and is a mechanism for adjusting the amount of light entering the image sensor 31b. The automatic aperture adjustment mechanism 31c is controlled via the imaging control unit 41 of the control unit 4, and the depth-of-field region can be changed as illustrated in the lower side of FIG. 22 by adjusting the amount of aperture by the automatic aperture adjustment mechanism 31c. Then, the control unit 4 calculates the index for evaluating whether or not the code has been decoded in the depth of field region based on the depth-of-field region according to the amount of aperture by the automatic aperture adjustment mechanism 31c. That is, by changing the amount of aperture of the automatic aperture adjustment mechanism 31c according to the interval between the workpieces W1 and W2, the process of associating a code and a workpiece can be performed.

Another Embodiment

Figure 23:
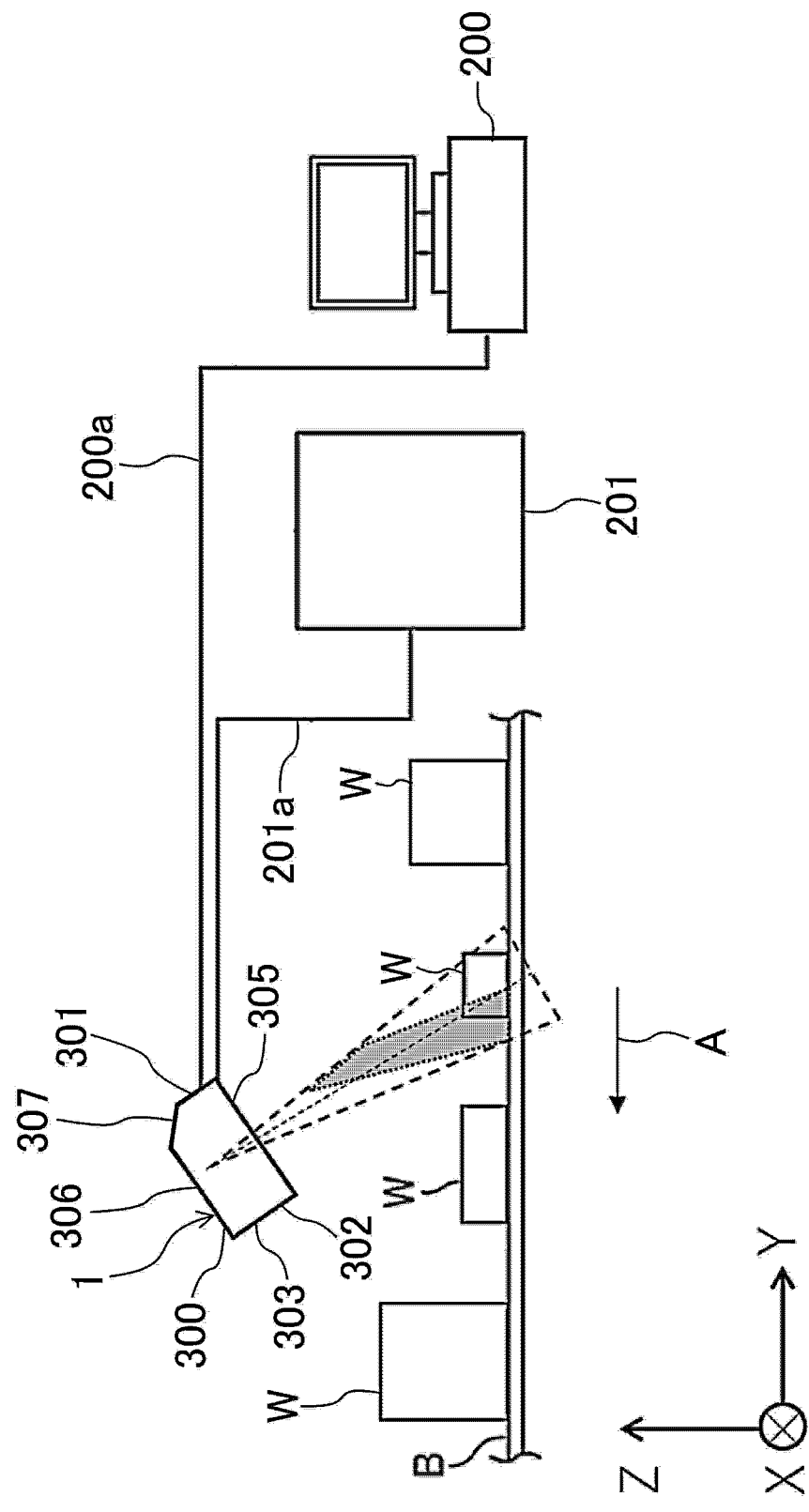
FIG. 23 is a view for describing the operation time of a code reader according to another embodiment.
Figure 24:
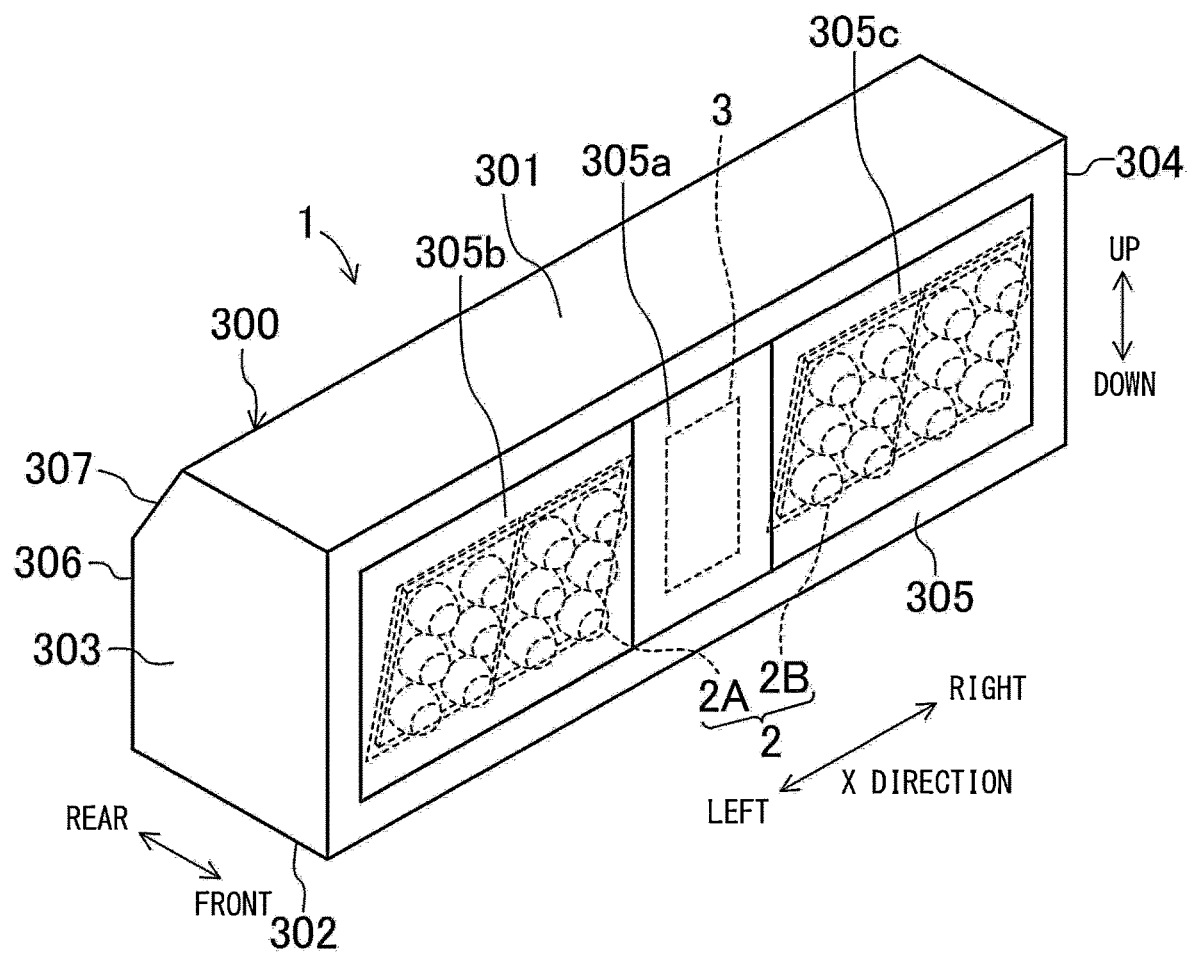
FIG. 24 is a perspective view of the code reader according to another embodiment.

FIG. 23 is a view for describing the operation time of the code reader 1 according to another embodiment of the invention. In addition, FIG. 24 is a perspective view illustrating an appearance of the code reader 1 according to another embodiment of the invention. In this another embodiment, a configuration of the illumination unit 2 is mainly different from that of the above embodiment. Hereinafter, the same parts as those in the above embodiment will be denoted by the same reference signs and will not be described, and parts different from those of the above embodiment will be described in detail.

The code reader 1 according to another embodiment includes a housing 300 that houses the illumination unit 2 and the imaging unit 3. The housing 300 has a shape elongated in an X direction, and an up-down direction, a horizontal direction (the X direction), and a front-rear direction are defined as illustrated in FIG. 24. These definitions of the directions are intended for facilitating the description of the embodiment, and do not limit directions when the code reader 1 is used. For example, the code reader 1 can be installed such that a longitudinal direction of the housing 300 faces the up-down direction or an inclined direction.

The housing 300 includes an upper wall 301, a lower wall 302, a left wall 303, a right wall 304, a front wall 305, and a rear wall 306. As illustrated in FIG. 23, the front wall 305 is arranged so as to face the workpiece W when the code reader 1 is installed. Therefore, as illustrated in FIG. 24, the front wall 305 is provided with a light receiving window 305a that transmits reflected light from the workpiece W, and is provided with a left light projection window (first light projection window) 305b and a right light projection window (second light projection window) 305c that transmit illumination light emitted from the illumination unit 2. The light receiving window 305a is positioned at the center of the front wall 305 in the longitudinal direction, and the left light projection window 305b is positioned on the left of the front wall 305, and the right light projection window 305c is positioned on the right of the front wall 305. That is, the left light projection window 305b and the right light projection window 305c are arranged so as to sandwich the light receiving window 305a in the left-right direction, and the left light projection window 305b, the light receiving window 305a, and the right light projection window 305c are aligned in a line in the longitudinal direction of the housing 300.

The housing 300 is provided with a cut plane 307 on a side (the rear side in this example) opposite to the light receiving window 305a. The cut plane 307 is formed by chamfering an upper portion of the upper wall 301 and a rear portion of the rear wall 306, and an angle of the chamfering is not particularly limited, but is, for example, 45 degrees. The imaging unit 3 is configured such that a focal plane of the Scheimpflug optical system 31 is substantially vertical when the cut plane 307 is substantially parallel to the horizontal plane. That is, the Scheimpflug optical system 31 is fixed so as not to move relative to the housing 300, and thus, an angle formed by the focal plane of the Scheimpflug optical system 31 and the horizontal plane changes depending on a direction of the housing 300. A conveying surface of the conveyor B is often substantially horizontal, and in many cases, it is desired that the focal plane of the Scheimpflug optical system 31 is substantially perpendicular (substantially vertical) to the conveying surface of the conveyor B. In response to this, if an operator adjusts the cut plane 307 to be substantially horizontal with a level or the like when installing the code reader 1 according to the present embodiment as illustrated in FIG. 23, the focal plane of the Scheimpflug optical system 31 is automatically set to be substantially perpendicular to the conveying surface of the conveyor B, so that installation work can be easily performed. The cut plane 307 can also be referred to as a guide surface, a mark, or the like at the time of installation of the code reader 1. Note that a location where the cut plane 307 is formed is not limited to the above-described location, and may be, for example, the front side or the lower side of the housing 300. However, since the left light projection window 305b, the right light projection window 305c, and the light receiving window 305a are provided on the front side of the housing 300, it is preferable to provide the cut plane 307 on the rear side of the housing 300 from the viewpoint of securing a larger area for these.

Figure 25:
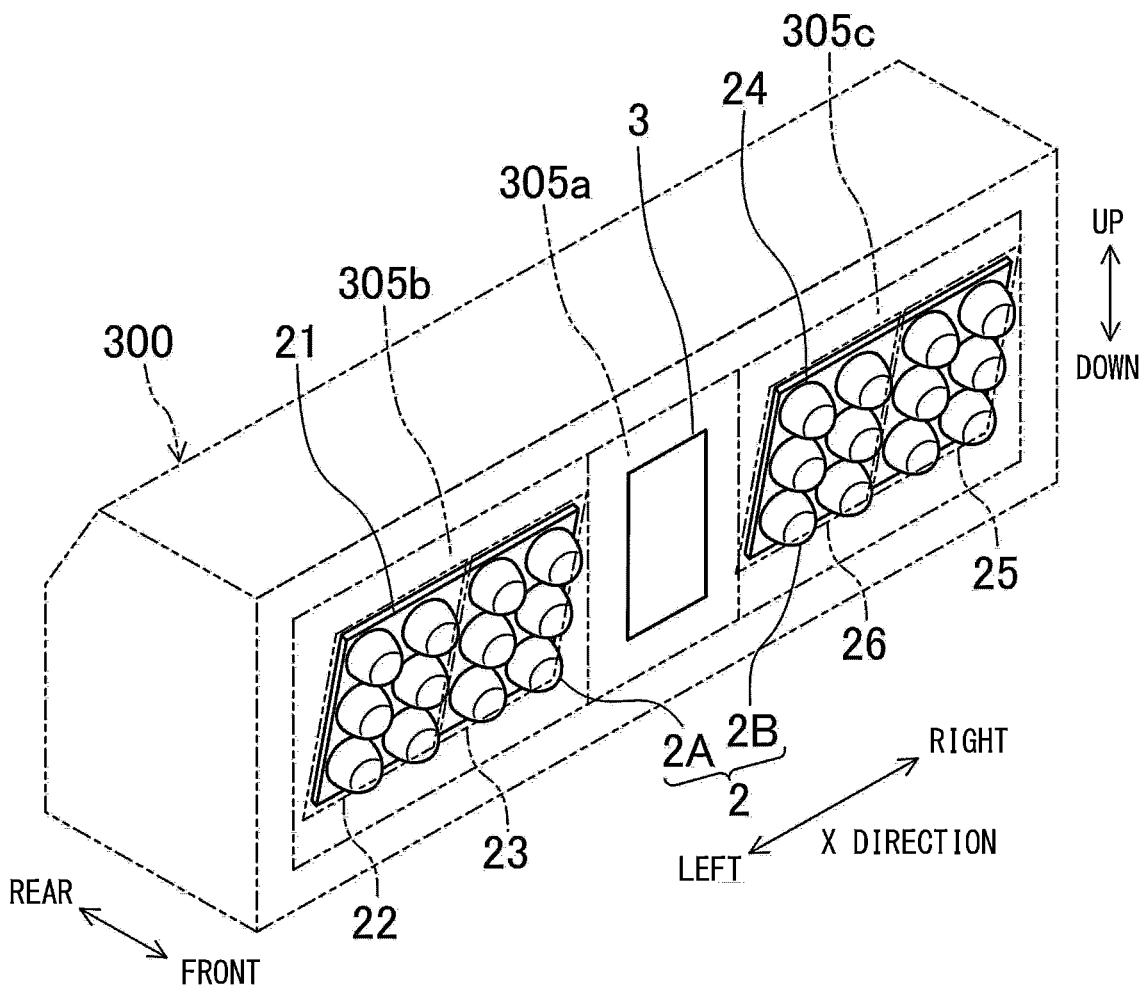
FIG. 25 is a view illustrating a positional relationship between an illumination unit and an imaging unit of the code reader according to another embodiment.

As illustrated in FIGS. 24 and 25, the illumination unit 2 of this embodiment includes a left illumination unit 2A housed in a left part in the housing 300 and a right illumination unit 2B housed in a right part in the housing 300. The left light projection window 305b is positioned in front of the left illumination unit 2A, and the first light projection window 305b has a sufficient size so as not to block illumination light emitted from the left illumination unit 2A. In addition, the right light projection window 305c is positioned in front of the right illumination unit 2B, and the right light projection window 305c has a sufficient size so as not to block illumination light emitted from the right illumination unit 2B.

Meanwhile, the imaging unit 3 is housed at the center in the left-right direction in the housing 300. The light receiving window 305a is positioned in front of the imaging unit 3. Therefore, the imaging unit 3 is arranged so as to be sandwiched between the left illumination unit 2A and the right illumination unit 2B in the left-right direction. When viewed along an optical axis of the lens 31a of the imaging unit 3, the light receiving window 305a is arranged between the left illumination unit 2A and the right illumination unit 2B.

The illumination unit 2 includes the plurality of illumination units, and makes light distribution angles of the plurality of illumination units different so as to suppress insufficiency of illuminance on a far side with respect to a near side of the focal plane 7 of the Scheimpflug optical system 31 or to make illuminance on the far side higher than illuminance on the near side. The illuminance is a light flux incident per unit area. The light flux is the amount of light emitted from a light source per unit time.

Assuming that the light distribution angles are substantially the same, in an image obtained by the imaging unit 3 receiving the light reflected from a side surface of a workpiece located on the focal plane, insufficiency of luminance occurs in an image region (a lower portion in a V direction) corresponding to the far side of the focal plane with respect to an image region (an upper portion in the V direction) corresponding to the near side of the focal plane due to the insufficiency of illuminance on the far side with respect to the near side of the focal plane. However, it is possible to suppress the insufficiency of luminance in the lower portion in the V direction with respect to the upper portion in the V direction of the image according to the above configuration. In addition, as in a modified example to be described later, in the illumination unit 2, positions where optical axes of the plurality of illumination units intersect the focal plane 7 may be made different in a direction in which the focal plane 7 extends.

In a code image obtained by the above configuration, a state in which the insufficiency of luminance on the far side with respect to the near side is suppressed as compared with the related art may be defined as, for example, a state in which an average luminance value of a dark code on the far side is 50% or more of an average luminance value of a bright code on the near side. In addition, the average luminance value of the dark code on the far side may be defined as 60% or more of the average luminance value of the bright code on the near side. This will be described later in detail.

In the code image obtained by the above configuration, the state in which the insufficiency of luminance on the far side with respect to the near side is suppressed as compared with the related art can also be said to be brightness to an extent that a code at any position on the focal plane of the Scheimpflug optical system 31 can be read. That is, there is a case where reading is possible by taking time in decoding processing performed by the decoding unit 44 even if a code image generated by capturing an image of a code is dark. However, in the code reader 1 that reads the code attached to the workpiece W moving on the conveyor B as in the present embodiment, it is necessary to complete reading of the code within a short time (predetermined time). Since the insufficiency of luminance on the far side with respect to the near side in the code image is suppressed as compared with the related art, the code at any position on the focal plane can be read within the predetermined time. The predetermined time is a time determined based on the conveying speed of the workpiece W, and is not particularly limited. For example, the predetermined time may be a time at which reading of a previously captured code image ends before reading of a next captured code image is started.

Hereinafter, an example of the configuration of the illumination unit 2 capable of suppressing the insufficiency of illuminance on the far side with respect to the near side of the focal plane 7 or making the illuminance on the far side higher than the illuminance on the near side will be specifically described. As illustrated in FIG. 25, the left illumination unit 2A includes a left illumination substrate 21, a left narrow-angle illumination unit (first narrow-angle illumination unit) 22 that emits narrow-angle illumination light, and a left wide-angle illumination unit (first wide-angle illumination unit) 23 that emits wide-angle illumination light wider than an irradiation angle of the narrow-angle illumination light. On the other hand, the right illumination unit 2B includes a right illumination substrate 24, a right narrow-angle illumination unit (second narrow-angle illumination unit) 25 that emits narrow-angle illumination light, and a right wide-angle illumination unit (second wide-angle illumination unit) 26 that emits wide-angle illumination light wider than an irradiation angle of the narrow-angle illumination light.

The left narrow-angle illumination unit 22 is housed on the leftmost side in the housing 300. The left wide-angle illumination unit 23 is housed on the right of the left narrow-angle illumination unit 22 in the housing 300. The right narrow-angle illumination unit 25 is housed on the rightmost side in the housing 300. The right wide-angle illumination unit 26 is housed on the left of the right narrow-angle illumination unit 25 in the housing 300. Therefore, when viewed along the optical axis of the lens 31a of the imaging unit 3, the left wide-angle illumination unit 23 is arranged between the left narrow-angle illumination unit 22 and the light receiving window 305a, and the right wide-angle illumination unit 26 is arranged between the right narrow-angle illumination unit 25 and the light receiving window 305a. That is, when viewed along the optical axis of the lens 31a of the imaging unit 3, the left narrow-angle illumination unit 22, the right narrow-angle illumination unit 25, the left wide-angle illumination unit 23, the right wide-angle illumination unit 26, and the light receiving window 305a are aligned in a line in the longitudinal direction of the housing 300.

Figure 26:
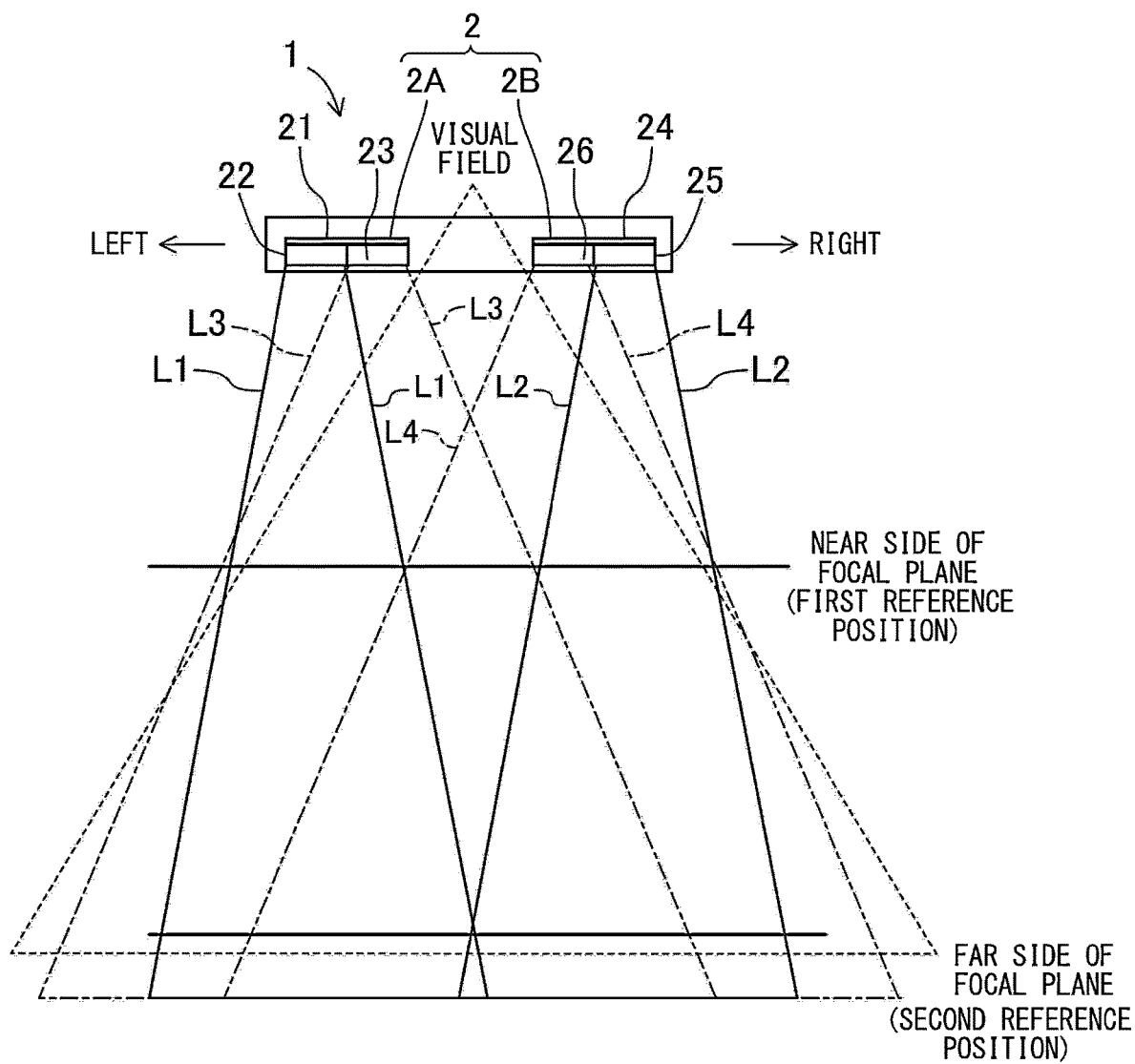
FIG. 26 is a view for describing the degree of overlap between narrow-angle illumination light and wide-angle illumination light.

FIG. 26 is a view schematically illustrating illumination ranges of the left narrow angle illumination unit 22, the left wide-angle illumination unit 23, the right narrow-angle illumination unit 25, and the right wide-angle illumination unit 26. In the drawing, two solid lines L1 extending from the left narrow-angle illumination unit 22 indicate the illumination range of the narrow-angle illumination light emitted from the left narrow-angle illumination unit 22. In addition, two solid lines L2 extending from the right narrow-angle illumination unit 25 indicate the illumination range of the narrow-angle illumination light emitted from the right narrow-angle illumination unit 25. The illumination range of the narrow-angle illumination light emitted from the left narrow-angle illumination unit 22 and the illumination range of the narrow-angle illumination light emitted from the right narrow-angle illumination unit 25 are equal, but may be different from each other.

Two dashed-dotted lines L3 extending from the left wide-angle illumination unit 23 indicate the illumination range of the wide-angle illumination light emitted from the left wide-angle illumination unit 23. In addition, two dashed-dotted lines L4 extending from the right wide-angle illumination unit 26 indicate the illumination range of the narrow-angle illumination light emitted from the right wide-angle illumination unit 26. The illumination range of the wide-angle illumination light emitted from the left wide-angle illumination unit 23 and the illumination range of the wide-angle illumination light emitted from the right wide-angle illumination unit 26 are equal, but may be different from each other.

In a case where the far side and the near side of the focal plane of the Scheimpflug optical system 31 are defined as illustrated in FIG. 26, the degree of overlap between the narrow-angle illumination light and the wide-angle illumination light on the far side of the focal plane of the Scheimpflug optical system 31 is configured to be higher than the degree of overlap between the narrow-angle illumination light and the wide-angle illumination light on the near side of the focal plane of the Scheimpflug optical system 31. Although a light flux reaching the far side of the focal plane is lower than a light flux reaching the near side, it is possible to suppress the insufficiency of illuminance on the far side with respect to the near side of the focal plane or to make the illuminance on the far side equal to or higher than the illuminance on the near side since the degree of overlap between the narrow-angle illumination light and the wide-angle illumination light is set to be higher on the far side of the focal plane.

For example, a first reference position separated from the illumination unit 2 by a first distance is assumed as the near side of the focal plane of the Scheimpflug optical system 31, and a second reference position separated from the illumination unit 2 by a second distance, longer than the first distance, is assumed as the far side of the focal plane of the Scheimpflug optical system 31. The illumination unit 2 can be configured such that, on the near side of the focal plane of the Scheimpflug optical system 31, the illumination light of the left narrow-angle illumination unit 22 overlaps the illumination light of the left wide-angle illumination unit 23 but does not overlap the illumination light of the right wide-angle illumination unit 26, and the illumination light of the right narrow-angle illumination unit 25 overlaps the illumination light of the right wide-angle illumination unit 26 but does not overlap the illumination light of the left wide-angle illumination unit 23.

In addition, the illumination unit 2 can be configured such that both beams of the illumination light of the left narrow-angle illumination unit 22 and the right narrow-angle illumination unit 25 overlap both beams of the illumination light of the left wide-angle illumination unit 23 and the right wide-angle illumination unit 26 on the far side of the focal plane of the Scheimpflug optical system 31. On the far side of the focal plane, the illumination light of the left wide-angle illumination unit 23 and the illumination light of the right wide-angle illumination unit 26 overlap each other.

Figure 27:
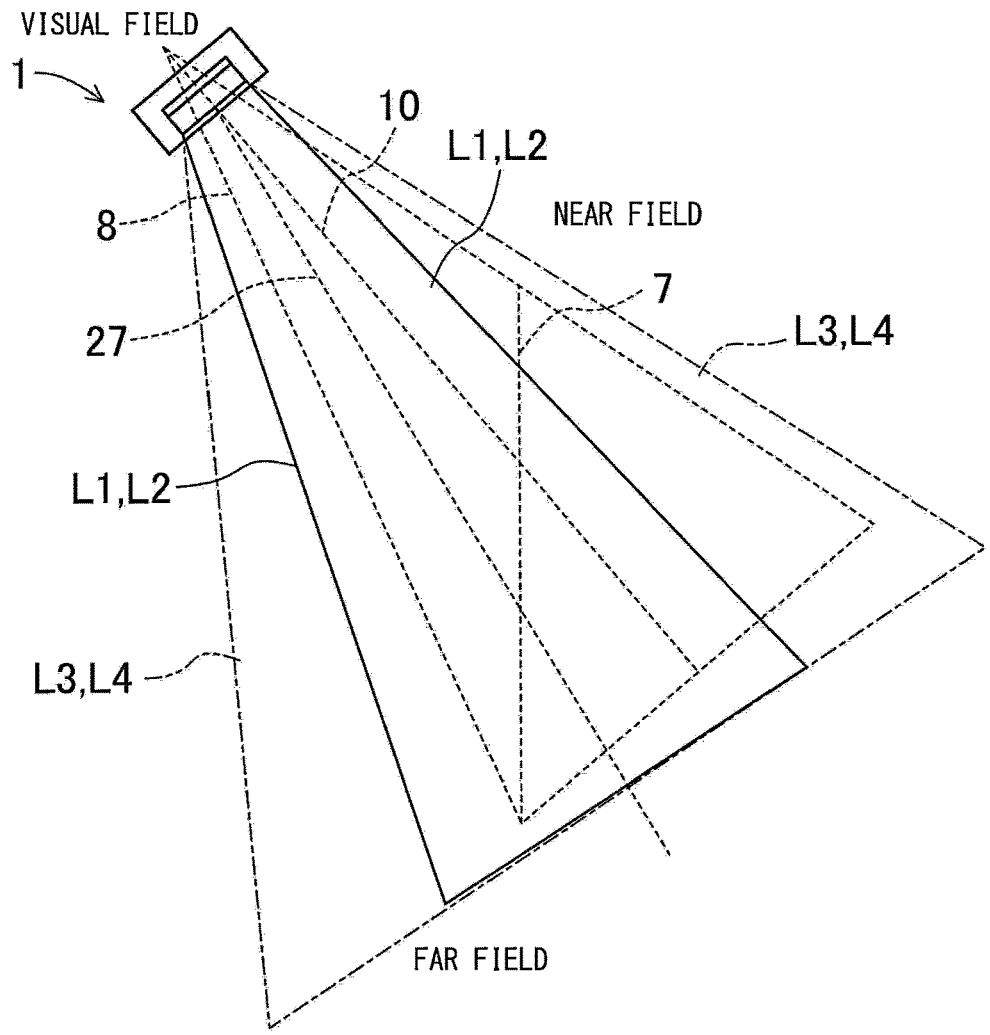
FIG. 27 is a schematic view illustrating the narrow-angle illumination light, the wide-angle illumination light, an optical axis of the illumination unit, and an optical axis of a lens of the imaging unit.

FIG. 27 is a schematic view of the code reader 1 when viewed from the side. In FIG. 27, a visual field range of the imaging unit 3 is indicated by a broken line with reference sign 8, the optical axis of the lens 31a of the imaging unit 3 is indicated by reference sign 10, and an optical axis of the illumination unit 2 is indicated by reference sign 27. As illustrated in FIG. 27, the optical axis 27 of the illumination unit 2 and the optical axis 10 of the lens 31a of the imaging unit 3 have different angles, and the optical axis 27 of the illumination unit 2 is directed to the far side of the focal plane 7 of the Scheimpflug optical system 31 more than the optical axis 10 of the lens 31a. Optical axes of the narrow-angle illumination units 22 and 25 and optical axes of the wide-angle illumination units 23 and 26 have the same angle with respect to the horizontal plane, and are in a positional relationship in which the optical axes of the narrow-angle illumination units 22 and 25 overlap the optical axes of the wide-angle illumination units 23 and 26 when viewed from the side. The optical axes of the narrow-angle illumination units 22 and 25 and the optical axes of the wide-angle illumination units 23 and 26 are collectively denoted by reference sign 27 as the optical axis of the illumination unit 2. That is, a region where the narrow-angle illumination light and the wide-angle illumination light overlap each other on the focal plane 7 is configured to be is unevenly distributed to the far side of the focal plane 7 with respect to the near side. Therefore, the insufficiency of illuminance on the far side with respect to the near side of the focal plane 7 is suppressed, so that the brightness of the image sensor can be approximated to be uniform in the V direction. Note that, even if the insufficiency of illuminance is suppressed on the near side and the far side of the focal plane 7 and the illuminance becomes substantially the same, the amount of received light received by the imaging unit 3 of reflected light from the far side is smaller than the amount of received light received by the imaging unit 3 of reflected light from the near side according to the inverse square law. Accordingly, the illumination unit 2 may be configured such that the illuminance on the far side of the focal plane 7 is equal to or higher than the illuminance on the near side in order to obtain an image with more uniform brightness. In addition, in order to further suppress the insufficiency of illuminance on the far side with respect to the near side of the focal plane 7, or in order to easily make the illuminance on the far side equal to or higher than the illuminance on the near side, the positions where the respective optical axes of the plurality of illumination units intersect the focal plane 7 may be made different in the direction in which the focal plane 7 extends by setting the optical axes of the narrow-angle illumination units 22 and 25 and the optical axes of the wide-angle illumination units 23 and 26 so as not to overlap each other in a side view as in the modified example to be described later if necessary, or a light flux of the illumination unit that has the optical axis intersecting the focal plane 7 on the farther side may be made relatively high.

Figure 28:
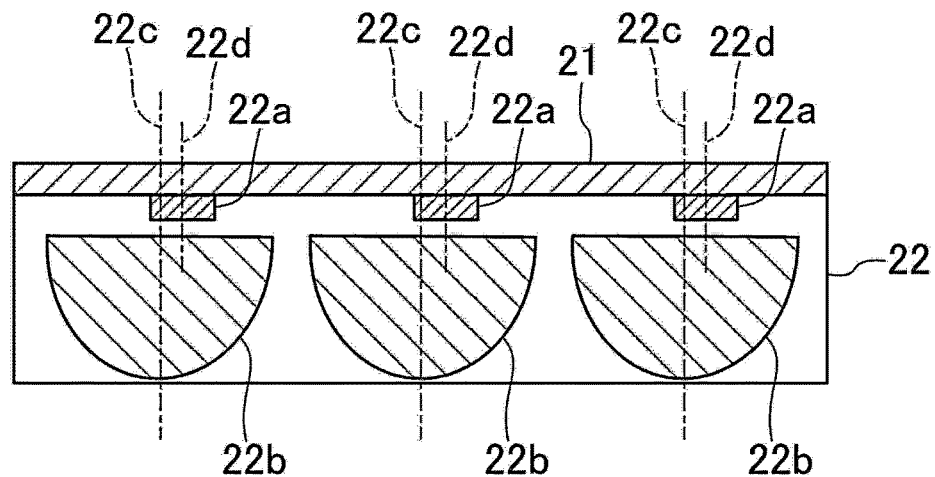
FIG. 28 is a cross-sectional view illustrating a relative positional relationship between the lens of the illumination unit and a light emitting element.

FIG. 28 is a cross-sectional view of the left narrow-angle illumination unit 22 of the illumination unit 2. The left narrow angle illumination unit 22 includes a plurality of light emitting elements (light emitting units) 22a including light emission diodes mounted on the left illumination substrate 21, and a lens 22b that collects beams of light respectively emitted from the light emitting elements 22a. A central axis of the lens 22b of the left narrow angle illumination unit 22 is indicated by reference sign 22c. Further, a central axis of the light emitting element 22a is indicated by reference sign 22d. The central axis of the light emitting element 22a passes through a central portion of a light emitting surface of the light emitting element 22a and is perpendicular to the light emitting surface.

The lens 22b of the left narrow-angle illumination unit 22 is arranged such that the central axis 22c of the lens 22b is different from the central axis 22d of the light emitting element 22a. That is, the central axis 22c of the lens 22b and the central axis 22d of the light emitting element 22a are offset from each other. Therefore, the optical axis 27 of the illumination unit 2 is directed to the far side of the focal plane 7 of the Scheimpflug optical system 31. The left wide-angle illumination unit 23, the right narrow-angle illumination unit 25, and the right wide-angle illumination unit 26 can also be configured similarly to the left narrow-angle illumination unit 22.

In addition, the optical axis 27 of the illumination unit 2 may be directed to the far side of the focal plane 7 of the Scheimpflug optical system 31 by arranging the light emitting element 22a and the lens 22b coaxially and arranging the lens 22b to have an asymmetric shape with respect to the central axis 22d of the light emitting element 22a.

In addition, the optical axis 27 of the illumination unit 2 may be directed to the far side of the focal plane 7 of the Scheimpflug optical system 31 by arranging the light emitting element 22a and the lens 22b coaxially and inclining the left illumination substrate 21.

In addition, the illumination unit 2 may include a plurality of the light emitting elements 22a having mutually different light fluxes. In this case, it is possible to achieve a configuration in which the insufficiency of illuminance on the far side with respect to the near side of the focal plane of the Scheimpflug optical system 31 is suppressed or the illuminance on the far side is equal to or higher than the illuminance on the near side using the plurality of light emitting elements 22a. That is, when a light flux of a light emitting element that irradiates the far side of the focal plane 7 of the Scheimpflug optical system 31 with illumination light is made higher than a light flux of a light emitting element that irradiates the near side of the focal plane 7 of the Scheimpflug optical system 31 with illumination light, it is easier to suppress the insufficiency of illuminance on the far side with respect to the near side of the focal plane 7 of the Scheimpflug optical system 31 or to make the illuminance on the far side equal to or higher than the illuminance on the near side. The light fluxes may be made different from each other by control of the light emitting elements 22a, or the light fluxes may be made different from each other by performance of the light emitting elements 22a without depending on the control of the light emitting element 22a.

(Modified Example of Another Embodiment)

The illumination unit 2 according to a first modified example of another embodiment includes a plurality of illumination units in which positions where optical axes of illuminations intersect the focal plane 7 are made different from in a direction in which a focal plane extends. That is, the illumination unit 2 makes the positions where the respective optical axes of the plurality of illumination units intersect the focal plane 7 different in the direction in which the focal plane 7 extends so as to suppress insufficiency of illuminance on a far side with respect to a near side of the focal plane 7 of the Scheimpflug optical system 31 or to make illuminance on the far side equal to or higher than illuminance on the near side.

Figure 33A:
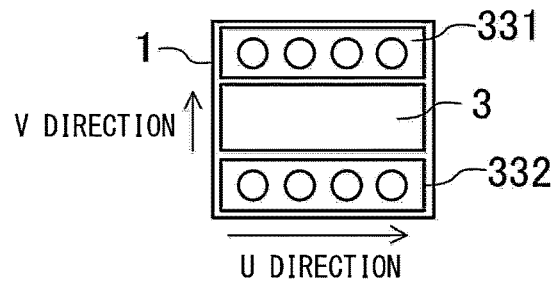
FIG. 33A is a view illustrating a positional relationship between an illumination unit and an imaging unit of a code reader according to a first modified example of another embodiment.
Figure 33B:
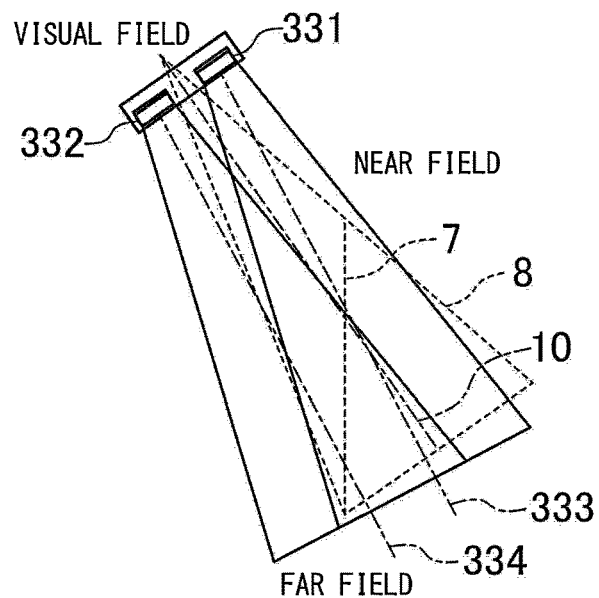
FIG. 33B is a schematic view illustrating near-field illumination light, far-field illumination light, an optical axis of the illumination unit, and an optical axis of a lens of the imaging unit according to the first modified example of another embodiment.
Figure 33C:
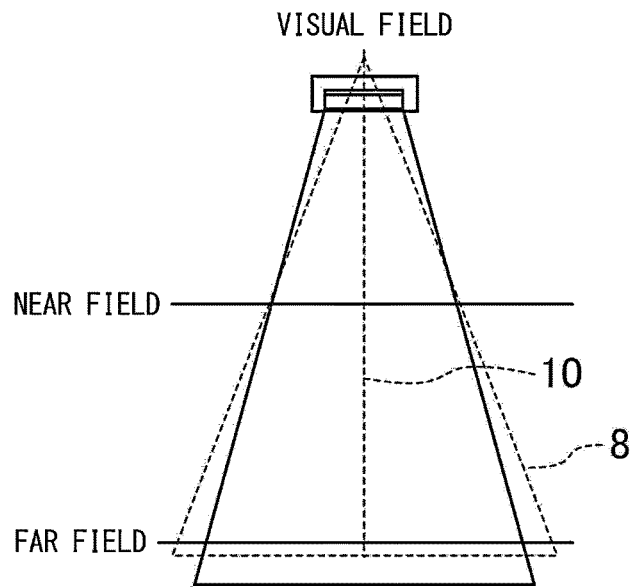
FIG. 33C is a view for describing the degree of overlap between the near-field illumination light and the far-field illumination light according to the first modified example of another embodiment.

FIGS. 33A, 33B, and 33C illustrate the first modified example of another embodiment. As illustrated in FIG. 33A, the illumination unit 2 includes a plurality of illumination units in which the near-field illumination unit 331 and a far-field illumination unit 332 are arranged side by side in a V direction of the image sensor 31a with the imaging unit 3 interposed therebetween. As illustrated in FIG. 33B, when the code reader 1 is viewed from the side, the illumination unit 2 includes the near-field illumination unit 331 having an optical axis 333 that intersects the focal plane 7 on the near side with respect to the far side of the focal plane 7, and the far-field illumination unit 332 having an optical axis 334 that intersects the focal plane 7 on the far side with respect to the near side of the focal plane 7, and an angle formed between the optical axis 333 and the focal plane 7 is substantially equal to an angle formed between the optical axis 334 and the focal plane 7. A region where illumination light from the near-field illumination unit 331 and illumination light from the far-field illumination unit 332 overlap each other on the focal plane 7 is configured to be unevenly distributed to the far side with respect to the near side of the focal plane 7, and thus, it is possible to suppress the insufficiency of illuminance on the far side with respect to the near side of the focal plane or to make the illuminance on the far side equal to or higher than the illuminance on the near side. As illustrated in FIG. 33C, when the code reader 1 is viewed from the front, it is preferable to suppress illumination unevenness by making the illumination light from the near-field illumination unit 331 and the illumination light from the far-field illumination unit 332 overlap each other. Therefore, luminance unevenness in a U direction of the image sensor is suppressed.

Figure 34A:
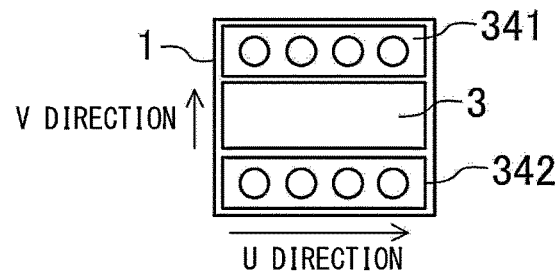
FIG. 34A is a view illustrating a positional relationship between an illumination unit and an imaging unit of a code reader according to a second modified example of another embodiment.
Figure 34B:
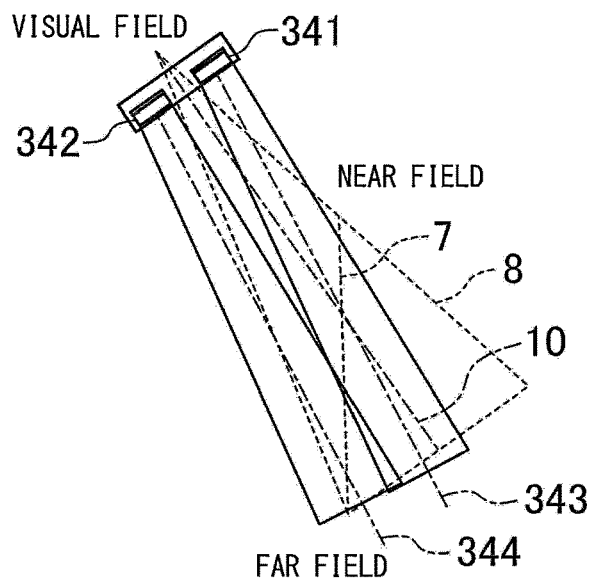
FIG. 34B is a schematic view illustrating near-field illumination light, far-field illumination light, an optical axis of the illumination unit, and an optical axis of a lens of the imaging unit according to the second modified example of another embodiment.
Figure 34C:
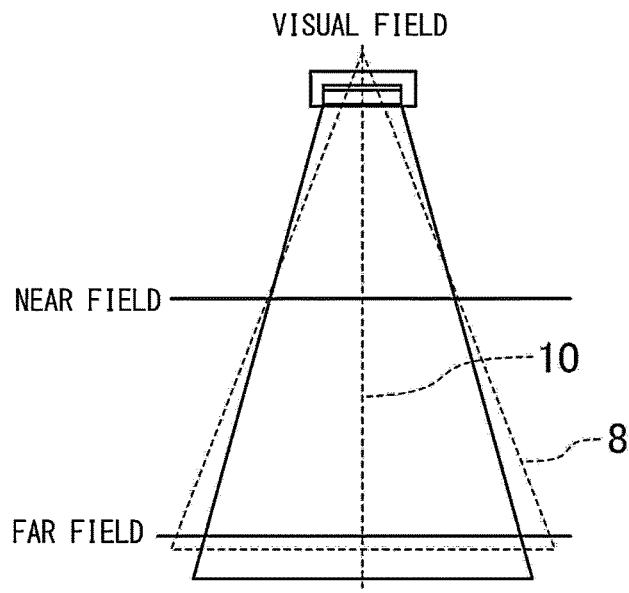
FIG. 34C is a view for describing the degree of overlap between the near-field illumination light and the far-field illumination light according to the second modified example of another embodiment.

FIGS. 34A, 34B, and 34C illustrate a second modified example of another embodiment. An arrangement of the illumination unit 2 is similar to that of the first modified example as illustrated in FIG. 34A, but light distribution angles of a near-field illumination unit 341 and a far-field illumination unit 342 are narrower than those of the first modified example as illustrated in FIG. 34B. Thus, a region where illumination light from the near-field illumination unit 341 and illumination light from the far-field illumination unit 342 overlap each other on the focal plane 7 is smaller than that of the first modified example. Instead, a light flux of the far-field illumination unit 342 is set to be higher than a light flux of the near-field illumination unit 341, so that it is possible to suppress insufficiency of illuminance on a far side with respect to a near side of the focal plane 7 or to make illuminance on the far side equal to or higher than illuminance on the near side. As illustrated in FIG. 34C, when the code reader 1 is viewed from the front, it is preferable to suppress illumination unevenness by making the illumination light from the near-field illumination unit 341 and the illumination light from the far-field illumination unit 342 overlap each other. Therefore, luminance unevenness in a U direction of the image sensor is suppressed.

Figure 35A:
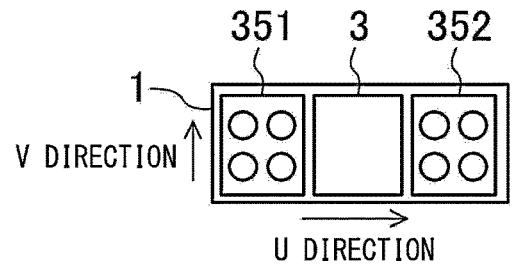
FIG. 35A is a view illustrating a positional relationship between an illumination unit and an imaging unit of a code reader according to a third modified example of another embodiment.
Figure 35B:
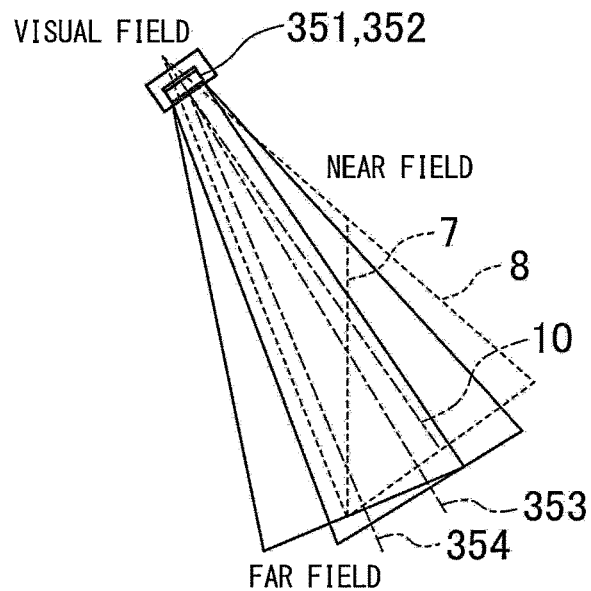
FIG. 35B is a schematic view illustrating near-field illumination light, far-field illumination light, an optical axis of the illumination unit, and an optical axis of a lens of the imaging unit according to the third modified example of another embodiment.
Figure 35C:
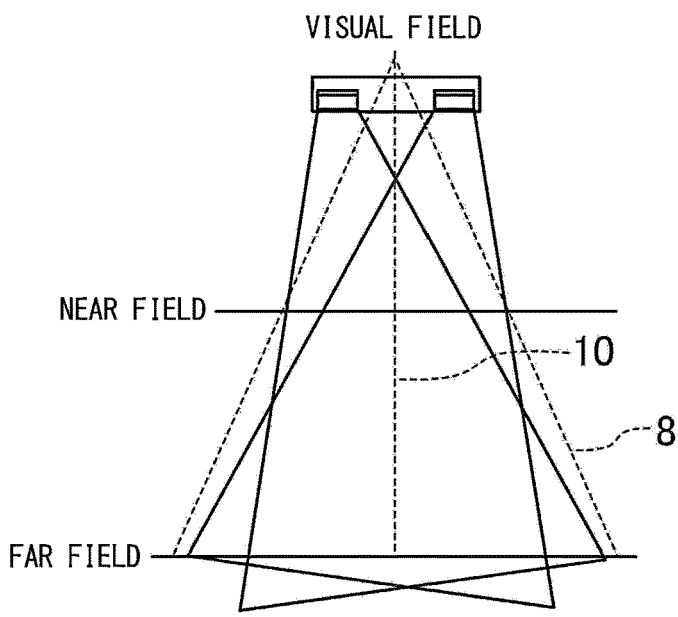
FIG. 35C is a view for describing the degree of overlap between the near-field illumination light and the far-field illumination light according to the third modified example of another embodiment.

FIGS. 35A, 35B, and 35C illustrate a third modified example of another embodiment. In the illumination unit 2, the near-field illumination unit 341 and the far-field illumination unit 342 are arranged side by side in a U direction of the image sensor 31a with the imaging unit 3 interposed therebetween. As illustrated in FIG. 35B, when the code reader 1 is viewed from the side, a near-field illumination unit 351 having an optical axis 353 that intersects the focal plane 7 on a near side with respect to a far side of the focal plane 7, and a far-field illumination unit 352 having an optical axis 354 that intersects the focal plane 7 on the far side with respect to the near side of the focal plane 7 are provided, and an angle formed between the optical axis 353 and the focal plane 7 is larger than an angle formed between the optical axis 354 and the focal plane 7. A region where illumination light from the near-field illumination unit 351 and illumination light from the far-field illumination unit 352 overlap each other on the focal plane 7 is configured to be unevenly distributed to the far side with respect to the near side of the focal plane 7, and thus, it is possible to suppress insufficiency of illuminance on the far side with respect to the near side of the focal plane 7 or to make illuminance on the far side equal to or higher than illuminance on the near side. As illustrated in FIG. 35C, when the code reader 1 is viewed from the front, it is preferable to suppress illumination unevenness by inclining each of the optical axis of the near-field illumination unit 351 and the optical axis of the far-field illumination unit 352 toward the optical axis 10 of the imaging unit 3 to make the illumination light from the near-field illumination unit 351 and the illumination light from the far-field illumination unit 352 overlap each other so as to be substantially symmetrical with respect to the optical axis 10. Therefore, luminance unevenness in a U direction of the image sensor is suppressed.

Figure 36A:
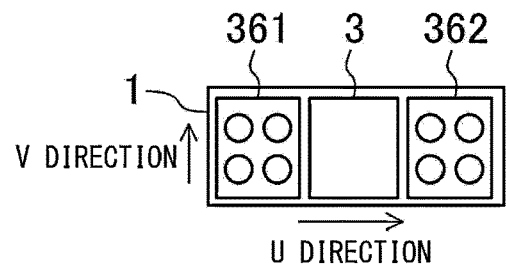
FIG. 36A is a view illustrating a positional relationship between an illumination unit and an imaging unit of a code reader according to a fourth modified example of another embodiment.
Figure 36B:
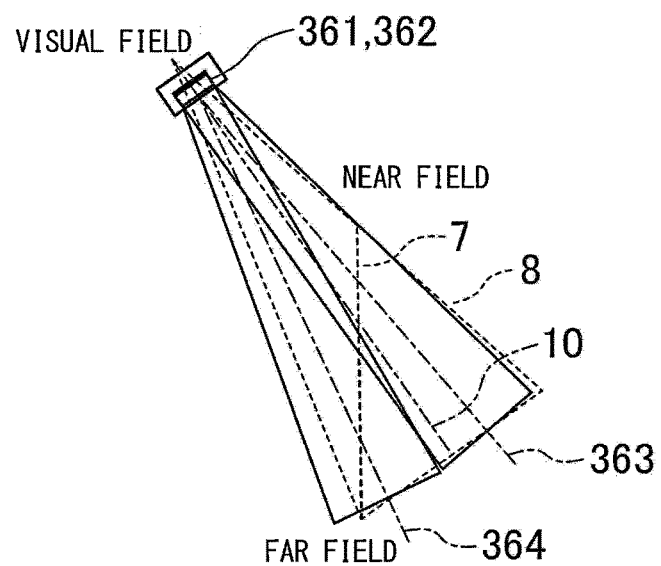
FIG. 36B is a schematic view illustrating near-field illumination light, far-field illumination light, an optical axis of the illumination unit, and an optical axis of a lens of the imaging unit according to the fourth modified example of another embodiment.
Figure 36C:
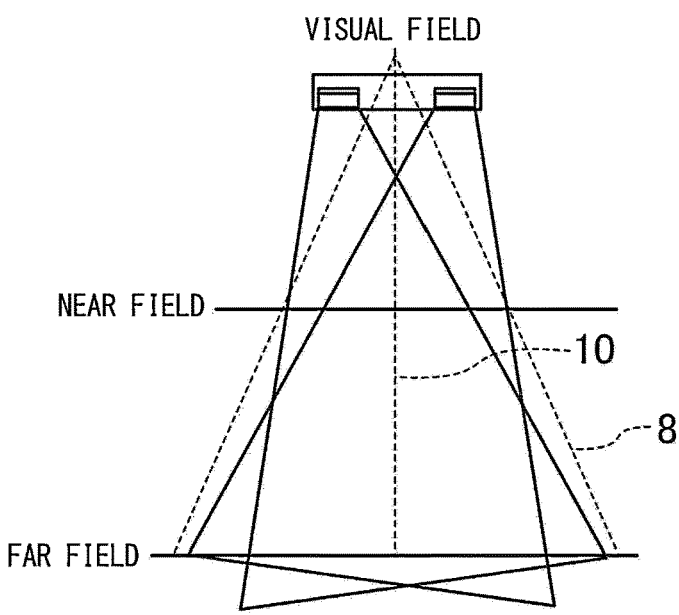
FIG. 36C is a view for describing the degree of overlap between the near-field illumination light and the far-field illumination light according to the fourth modified example of another embodiment.

FIGS. 36A, 36B, and 36C illustrate a fourth modified example of another embodiment. An arrangement of the illumination unit 2 is similar to that of the third modified example as illustrated in FIG. 36A, but light distribution angles of a near-field illumination unit 361 and a far-field illumination unit 362 are narrower than those of the third modified example as illustrated in FIG. 36B. Thus, a region where illumination light from the near-field illumination unit 361 and illumination light from the far-field illumination unit 362 overlap each other on the focal plane 7 is smaller than that of the third modified example. Instead, a light flux of the far-field illumination unit 362 is set to be higher than a light flux of the near-field illumination unit 361, so that it is possible to suppress insufficiency of illuminance on a far side with respect to a near side of the focal plane 7 or to make illuminance on the far side equal to or higher than illuminance on the near side. As illustrated in FIG. 36C, when the code reader 1 is viewed from the front, it is preferable to suppress illumination unevenness by making the illumination light from the near-field illumination unit 361 and the illumination light from the far-field illumination unit 362 overlap each other so as to be substantially symmetric with respect to the optical axis 10. Therefore, luminance unevenness in a U direction of the image sensor is suppressed.

Note that the first modified example, the second modified example, the third modified example, and the fourth modified example described above are not limited to the case where the near-field illumination unit 331, 341, 351, or 361 and the far-field illumination unit 332, 342, 352, or 362 have substantially the same light distribution angle, and the light distribution angles may be made different.

(Luminance Conversion)

Although a mechanism for generating a code image in which brightness is made more uniform on the near side and the far side of the imaging unit 3 as compared with the related art can be achieved by the configuration of the illumination unit 2 as described above, for example, a luminance conversion curve corresponding to an installation condition, a code condition, and the like of the code reader 1 may be applied to a code image to convert a luminance value of the code image, and decoding processing may be executed on the code image (converted code image) having the converted luminance value. Note that the configuration of the illumination unit 2 and the application of the luminance conversion curve may be used in combination, or only any one thereof may be performed.

The communication unit 6 of the code reader 1 is configured to be capable of receiving the installation condition and the code condition of the code reader 1. The installation condition includes at least any of an installation distance and an installation angle of the code reader 1. The code condition includes at least any of a code size and a code contrast value (print contrast signal).

When acquiring the installation condition and the code condition received by the communication unit 6, the control unit 4 determines a luminance change curve based on the acquired installation condition and code condition, and further acquires a first code image output from the imaging unit 3. The control unit 4 applies the determined luminance change curve to the first code image output from the imaging unit 3 to generate a second code image with a converted luminance value. The code detection unit 43 may execute the process of applying a luminance conversion curve corresponding to a V-direction position of the image sensor 31b to the first code image output from the imaging unit 3 to generate the second code image in which a luminance value has been converted using the luminance conversion curve. The decoding unit 44 of the control unit 4 executes decoding processing on the second code image.

The control unit 4 can also apply a luminance conversion curve corresponding to a V-direction position of the image sensor 31b to the first code image output from the imaging unit 3 to generate the second code image in which a luminance value has been converted using the luminance conversion curve, and execute decoding processing on the second code image. At this time, the second code image may be generated by applying a plurality of luminance conversion curves different from each other according to V-direction positions of the image sensor 31b. The plurality of luminance conversion curves may include a near-field luminance conversion curve that is to be applied to a V-direction position corresponding to the near side and a far-field luminance conversion curve that is to be applied to a V-direction position corresponding to the far side. The near-field luminance conversion curve is configured so as to make a luminance value of a first code higher as compared with the far-field luminance conversion curve, the luminance value being to be converted into zero in the second code image.

The control unit 4 may specify a position other than a reference focal position where a code is present in the first code image, and generate the second code image obtained by causing blown out highlights or crushed blacks at the specified position other than the reference focal position. In this case, the decoding unit 44 executes decoding processing on the second code image in which highlights have been blown-out or blacks have been crushed at positions other than the reference focal position.

Figure 29:
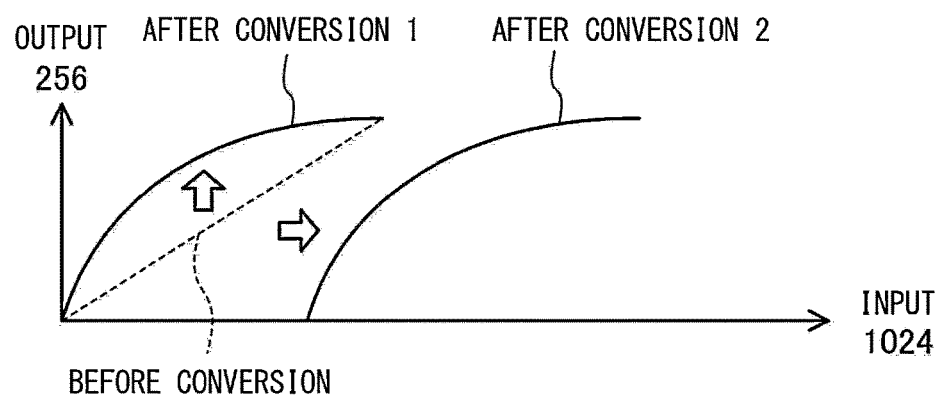
FIG. 29 is a graph illustrating examples of luminance conversion curves.

FIG. 29 is a graph illustrating that the luminance conversion curve is changed based on the installation condition and the code condition of the code reader, in which a horizontal axis indicates input luminance values in 1024 gradations, and a vertical axis indicates output luminance values in 256 gradations. As illustrated in this drawing, a shape of the luminance conversion curve can be changed and offset based on the installation condition and the code condition of the code reader 1. For example, regarding a height of the workpiece W (a target range of the focal plane), a difference between brightness and darkness is likely to become larger as the workpiece W is higher (the target range is wider), and thus, a luminance conversion curve with a wider input range is obtained. In addition, regarding the installation angle of the code reader 1, specular reflection components increase so that an image is brighter as a whole as an angle of the optical axis of the imaging unit 3 with respect to the workpiece W is steeper, and thus, a luminance conversion curve with an input range offset to the right of FIG. 27 is obtained. In addition, regarding the code size, for example, in a case where a narrow bar width is small, an input range is narrowed to obtain a luminance conversion curve that makes contrast of a converted code image clear. In addition, regarding the code contrast value, in a case where the code contrast value is low, an input range is narrowed to obtain a luminance conversion curve that makes contrast of a converted code image clear. Only any one of them may be executed, or any two or more thereof may be used in combination.

As a method for generating a code image in which brightness is made more uniform on the near side and the far side of the imaging unit 3 as compared with the related art, there is a method of using an illumination unit (an external illumination) housed in a housing (not illustrated) different from the housing 300, for example, in addition to a method of using the configuration and control of the illumination unit 2 housed in the housing 300 described above. When one or a plurality of external illuminations is used, it is possible to suppress the insufficiency of illuminance on the far side with respect to the near side of the focal plane of the Scheimpflug optical system 31 or to make the illuminance on the far side equal to or higher than the illuminance on the near side. In addition, when one or a plurality of external illuminations and the illumination unit 2 housed in the housing 300 are used in combination, it is possible to suppress the insufficiency of illuminance on the far side with respect to the near side of the focal plane of the Scheimpflug optical system 31 or to make the illuminance on the far side equal to or higher than the illuminance on the near side. In a case where the external illumination is used, brightness on the far side in the focal plane of the Scheimpflug optical system 31 can be compensated by the external illumination. The external illumination can be controlled by, for example, the illumination control unit 42 (illustrated in FIG. 3).

FIG. 30 illustrates an example of a code image generated by the code reader 1, and a quadrangle denoted by reference sign 7 indicates the focal plane. In this example, a cardboard box is used as the workpiece W. An upper code 400, a middle code 401, and a lower code 402 are attached to a side surface of the workpiece W. As illustrated in this drawing, it can be seen that images of both a code (the upper code 400) located on the near side of the focal plane of the Scheimpflug optical system 31 and a code (the lower code 402) located on the far side are captured with appropriate luminance (brightness with which decoding can be completed in a short time).

Figure 31A:
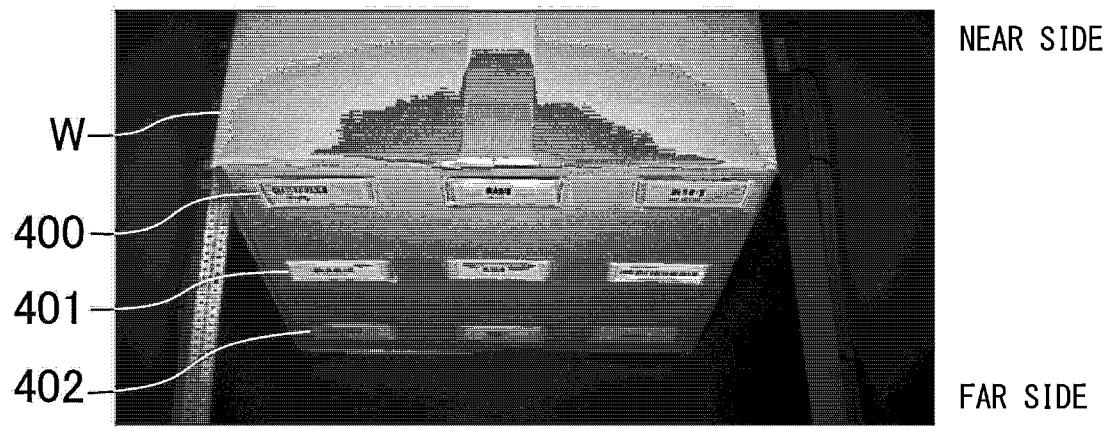
FIGS. 31A to 31C are views illustrating examples of code images according to a comparative example.
Figure 31B:
Figure 31C:
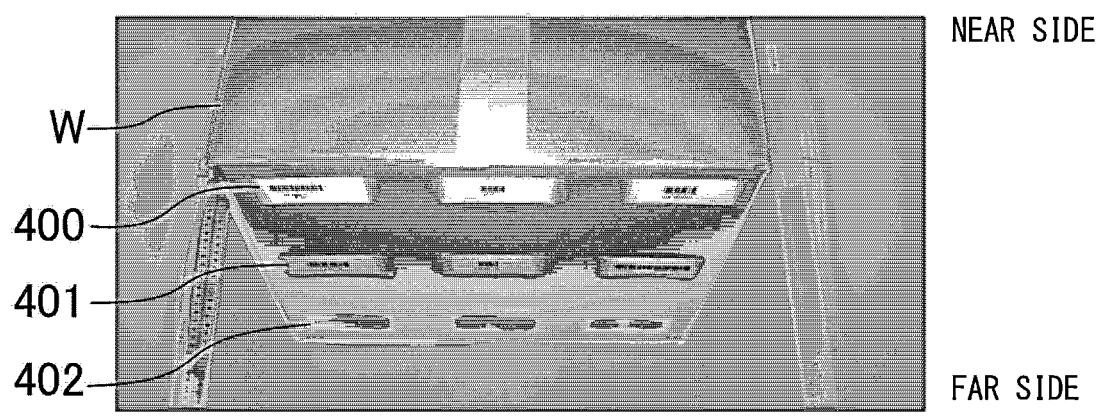

FIGS. 31A to 31C are views illustrating examples of code images according to a comparative example. The comparative example is a code reader that does not include an illumination configuration for suppressing insufficiency of illuminance on a far side with respect to a near side of the focal plane 7 of the Scheimpflug optical system 31 or making illuminance on the far side equal to or higher than illuminance on the near side. FIG. 31A illustrates an example of a code image in a case where an illumination condition is set such that the middle code 401 has appropriate luminance. In this case, the lower code 402 becomes dark, which results in that decoding is impossible or decoding requires a long time.

FIG. 31B illustrates an example of a code image in a case where an illumination condition is set such that the upper code 400 has appropriate luminance. In this case, the middle code 401 becomes dark, which results in that decoding is impossible or decoding requires a long time. Imaging of the lower code 402 has failed.

FIG. 31C illustrates an example of a code image in a case where an illumination condition is set such that the lower code 402 has appropriate luminance. In this case, the upper code 400 becomes too bright and a part thereof is overexposed, which results in that decoding is impossible or decoding requires a long time.

Figure 32A:
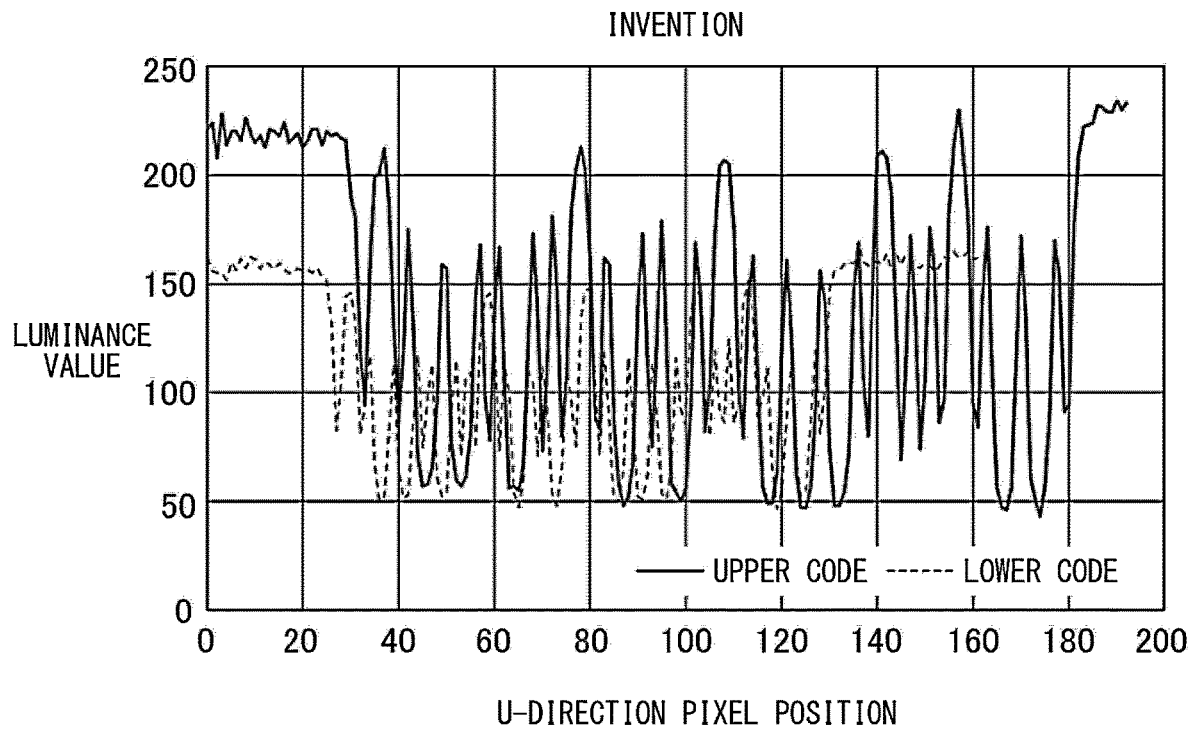
FIG. 32A is a graph illustrating luminance values of code images of the invention and the comparative example.

A graph illustrated in FIG. 32A illustrates luminance values of a code image generated by the code reader 1 according to the invention, and a graph illustrated on the lower side illustrates luminance values of a code image generated by the code reader according to the comparative example. A vertical axis of the graph represents the luminance values, and a horizontal axis represents pixel positions in the U direction of the image sensor 31b. A solid line of the graph indicates luminance values of the upper code 400, and a broken line indicates luminance values of the lower code 402.

As illustrated in the graph of FIG. 32A, an average of the luminance values of the upper code 400 is about 120, whereas an average of the luminance values of the lower code 402 is about 90. When the invention is applied, the average of the luminance values of the lower code 402 which is a dark code becomes about 70% of the average of the luminance values of the upper code 400 which is a bright code. When the average of the luminance values of the dark code is 50% or more of the average of the luminance values of the bright code, decoding of both the codes is completed in a short time. Thus, it is sufficient to configure the illumination unit 2 such that the average of the luminance values of the dark code is 50% or more of the average of the luminance values of the bright code, or to execute luminance value conversion processing. More preferably, the average of the luminance values of the dark code is 60% or more of the average of the luminance values of the bright code.

Figure 32B:
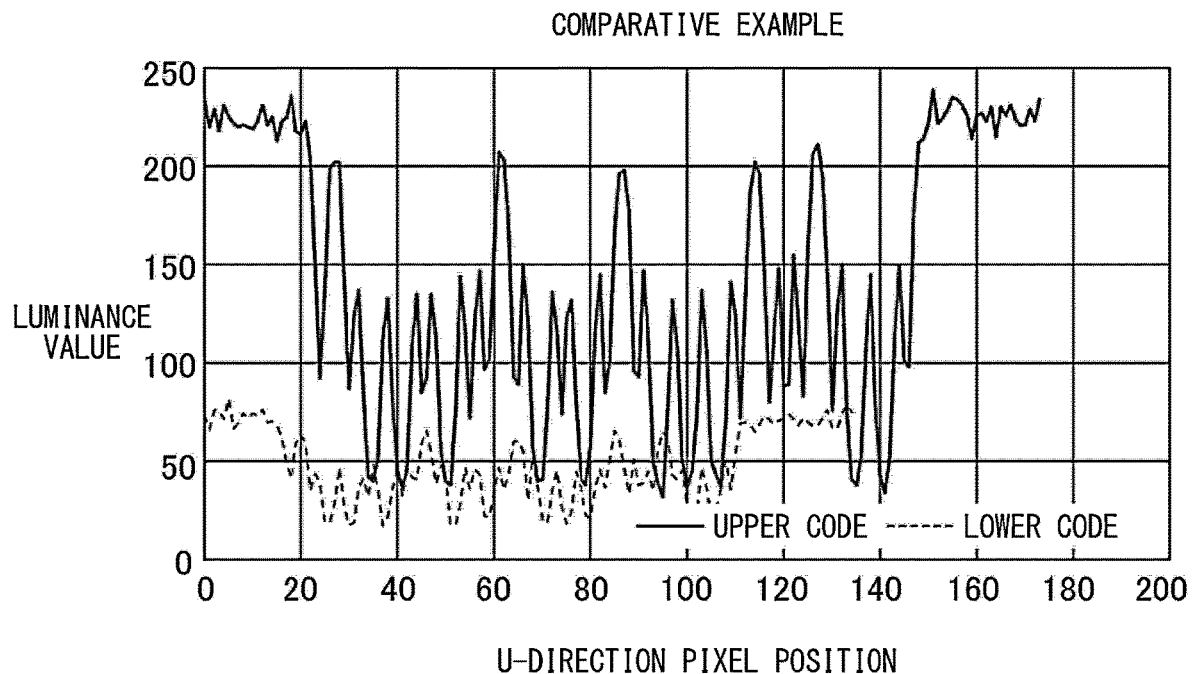
FIG. 32B is a graph illustrating luminance values of a code image of the comparative example.

As illustrated in the graph of FIG. 32B, in the case of the comparative example, an average luminance value of the upper code 400 is about 100, whereas an average luminance value of the lower code 402 is about 40. In this case, the average luminance value of the dark code is about 40% of the average luminance value of the bright code, which results in that decoding of the dark code is impossible or decoding requires a long time.

(Selection of Setting to Be Used for Decoding Processing)

Information regarding the installation condition and the code condition received by the communication unit 6 can be used at the time of selecting a setting for the far field to be used for decoding processing. For example, in a case where the setting for the far field to be used for decoding processing of a code located in the far field with respect to the imaging unit 3 has been selected, the control unit 4 can determine an execution region of super-resolution processing based on the installation condition and the code condition received by the communication unit 6.

In addition, settings to be used for the decoding processing may also include a setting for an intermediate position to be used for decoding processing of a code located (at an intermediate position) between the near field and the far field in addition to both a setting for the near field to be used for decoding processing of a code located in the near field with respect to the imaging unit 3 and the setting for the far field to be used for decoding processing of a code located in the far field with respect to the imaging unit 3. The setting for the intermediate position can be stored in the setting storage unit 53 of the storage unit 5 similarly to the other settings. There may be a plurality of settings for the intermediate position, and for example, a setting for a first intermediate position close to the near field and a setting for a second intermediate position close to the far field may be included in the settings for the intermediate position.

The control unit 4 determines a code candidate position in a code image with respect to the code image output from the imaging unit 3, selects any one of the setting for the near field, the setting for the far field, and the setting for the intermediate position from the setting storage unit 53 of the storage unit 5 based on the code candidate position, and executes decoding processing on the code image using the selected setting. In the setting for the intermediate position, super-resolution processing is applied more weakly as compared with the setting for the far field.

In addition, the control unit 4 may decode only the outside of a target region of super-resolution processing with the setting for the near field in a case where it is determined that the code candidate position is in the near field, and may execute super-resolution processing only on the target region and perform decoding with the setting for the far field in a case where it is determined as the far field.

The above-described embodiments are merely examples in all respects, and should not be construed in a limited manner. Further, all modifications and changes belonging to the equivalent range of the claims fall within the scope of the invention.

As described above, the code reader according to the invention can be used, for example, in the case of reading a code attached to a workpiece.

What is claimed is:

1. A code reader that reads a code attached to a workpiece, the code reader comprising:

an illumination unit that irradiates the workpiece with illumination light;

an imaging unit that includes a Scheimpflug optical system including a lens collecting reflected light from the code attached to the workpiece and an image sensor having a light receiving surface inclined with respect to an optical axis of the lens, the imaging unit generating and outputting a code image including the code based on an amount of received light received by the light receiving surface;

a decoding unit that executes decoding processing on the code image; and a control unit that associates a decoded code with the workpiece, wherein the Scheimpflug optical system has a visual field range, within which a depth-of-field region is tilted relative to the optical axis and intersects the optical axis at a predetermined angle, the control unit calculates an index for evaluating whether or not a code to which the decoding processing has been applied is a code that has been decoded in the depth-of-field region, and determines an accuracy of an association of the decoded code with the workpiece based on the calculated index, and when the control unit determines that the decoded code was not decoded within the depth-of-field region, the control unit determines that the association of the decoded code with the workpiece is inaccurate.

2. The code reader according to claim 1, wherein the imaging unit captures images of a plurality of the workpieces moving adjacent to each other on a conveyor to generate the code image in which a plurality of the codes including the codes respectively attached to the plurality of workpieces appear, and the control unit specifies a target workpiece located in the depth-of-field region at a point in time when the code image is captured, calculates the index based on information obtained from the code image, and determines that an association of a code, evaluated to have a relatively high possibility of having been decoded in the depth-of-field region, with the target workpiece is accurate based on the index.

3. The code reader according to claim 1, wherein the control unit calculates the index in such a manner that a possibility that the code to which the decoding processing has been applied in the code image is the code that has been decoded in the depth-of-field region increases as a differential value between luminance values of the code image is larger or as a difference between a maximum value and a minimum value of luminance values in a partial region of the code image is larger.

4. The code reader according to claim 1, wherein the control unit calculates the index in such a manner that a possibility that the code to which the decoding processing has been applied in the code image is the code that has been decoded in the depth-of-field region increases as a luminance value of the code image increases.

5. The code reader according to claim 1, wherein the control unit calculate the index in such a manner that a possibility that the code to which the decoding processing has been applied in the code image is the code that has been decoded in the depth-of-field region is high in a case where at least a part of the workpiece is included in the depth-of-field region at a point in time when the code image is captured.

6. The code reader according to claim 5, wherein the control unit calculates the index in such a manner that the possibility that the code to which the decoding processing has been applied is the code that has been decoded in the depth-of-field region is high in a case where a specific position of the workpiece is included in the depth-of-field region.

7. The code reader according to claim 1, wherein the control unit calculates the index in such a manner that a possibility that the code to which the decoding processing has been applied is the code that has been decoded in the depth-of-field region increases as a shape of the code is closer to a rectangle.

8. The code reader according to claim 1, wherein the control unit calculates the index based on contrast of the code image, and the control unit calculates the index in such a manner that a possibility that the code to which the decoding processing has been applied is the code that has been decoded in the depth-of-field region increases as the contrast is higher.

9. The code reader according to claim 1, wherein the control unit calculates the index based on a temporal change of the code image.

10. The code reader according to claim 1, wherein the control unit calculates the index based on an amount of high frequency components of the code image.

11. The code reader according to claim 1, wherein the control unit calculates the index based on a change between a first code image and a second code image generated after the first code image, calculates the index in such a manner that a possibility that a code of the second code image is the code that has been decoded in the depth-of-field region increases as high frequency components of the second code image are more than high frequency components of the first code image, and calculates the index in such a manner that the possibility that the code of the second code image is the code that has been decoded in the depth-of-field region decreases as the high frequency components of the second code image are fewer than the higher frequency components of the first code image.

12. The code reader according to claim 1, the code reader being configured to be capable of outputting an error signal in a case where the control unit determines that the code is associated with the wrong workpiece.

13. The code reader according to claim 1, wherein the imaging unit includes an aperture adjustment mechanism, and is configured to be capable of changing the depth-of-field region formed by the Scheimpflug optical system by adjusting an amount of aperture using the aperture adjustment mechanism, and the control unit calculates the index based on the depth-of-field region according to the amount of aperture.

14. A code reading method of reading a code attached to a workpiece, the code reading method comprising:

an illumination step of irradiating a workpiece with illumination light;

an imaging step of capturing an image of the workpiece by an imaging unit, which includes a Scheimpflug optical system including a lens collecting reflected light from the code attached to the workpiece and an image sensor having a light receiving surface inclined with respect to an optical axis of the lens, and generating and outputting a code image including the code based on an amount of received light received by the light receiving surface;

a decoding step of performing decoding processing on the code image;

an associating step of associating a decoded code with the workpiece;

a calculation step of calculating, based on a result of the decoding processing, an index for evaluating whether or not a code to which the decoding processing has been applied is a code that has been decoded in a depth-of-field region; and a determination step of determining an accuracy of an association of the decoded code with the workpiece based on the index calculated in the calculation step, wherein the Scheimpflug optical system has a visual field range, within which a depth-of-field region is tilted relative to the optical axis and intersects the optical axis at a predetermined angle, and when the determination step determines that the decoded code was not decoded within the depth-of-field region, the determination step determines that the association of the decoded code with the workpiece is inaccurate.

15. A code reader that reads a code attached to a workpiece, the code reader comprising:

an illumination unit that irradiates the workpiece with illumination light;

an imaging unit that includes a Scheimpflug optical system including a lens collecting reflected light from the code attached to the workpiece and an image sensor having a light receiving surface inclined with respect to an optical axis of the lens, the imaging unit generating and outputting a code image including the code based on an amount of received light received by the light receiving surface;

a decoding unit that executes decoding processing on the code image; and a control unit that associates a decoded code with the workpiece, wherein the Scheimpflug optical system has a visual field range, within which a depth-of-field region is tilted relative to the optical axis and intersects the optical axis at a predetermined angle, and when the control unit determines that the decoded code was not decoded within the depth-of-field region, the control unit determines that an association of the decoded code with the workpiece is inaccurate.

* * * * *